(12) United States Patent
Palestrant et al.

(10) Patent No.: US 8,019,639 B2
(45) Date of Patent: Sep. 13, 2011

(54) METHOD AND APPARATUS FOR CONDUCTING AN ONLINE INFORMATION SERVICE

(75) Inventors: Daniel Palestrant, Cambridge, MA (US); Graham Gardner, Sudbury, MA (US)

(73) Assignee: Sermo, Inc., Cambridge, MA (US)

( * ) Notice: Subject to any disclaimer, the term of this patent is extended or adjusted under 35 U.S.C. 154(b) by 871 days.

(21) Appl. No.: 11/483,393

(22) Filed: Jul. 7, 2006

(65) Prior Publication Data
US 2007/0061218 A1 Mar. 15, 2007

Related U.S. Application Data

(60) Provisional application No. 60/697,213, filed on Jul. 7, 2005.

(51) Int. Cl.
*G06Q 99/00* (2006.01)
(52) U.S. Cl. ............. 705/7.32; 705/7.37; 705/7.41
(58) Field of Classification Search ............ 705/7.32, 705/7.37
See application file for complete search history.

(56) References Cited

U.S. PATENT DOCUMENTS

| | | | | |
|---|---|---|---|---|
| 4,451,700 A | * | 5/1984 | Kempner et al. | ......... 379/88.01 |
| 4,591,980 A | | 5/1986 | Huberman | |
| 4,835,680 A | | 5/1989 | Hogg | |
| 4,835,732 A | | 5/1989 | Huberman | |
| 5,813,863 A | | 9/1998 | Sloane | |
| 5,815,665 A | | 9/1998 | Teper et al. | |
| 5,826,244 A | | 10/1998 | Huberman | |
| 5,916,024 A | | 6/1999 | Von Kohorn | |
| 5,950,176 A | | 9/1999 | Keiser | |
| 5,987,440 A | | 11/1999 | O'Neil | |
| 6,015,345 A | | 1/2000 | Kail | |
| 6,016,483 A | | 1/2000 | Rickard | |

(Continued)

FOREIGN PATENT DOCUMENTS
EP 1065607 A3 5/2002
(Continued)

OTHER PUBLICATIONS

Dignum et al. "Knowledge Market: Agent-mediated Knowledge sharing" accessed at http://igitur-archive.library.uu.nl/math/2007-0222-201611/dignum_03_knowledge.pdf.*

(Continued)

*Primary Examiner* — Beth V Boswell
*Assistant Examiner* — Adrian McPhillip
(74) *Attorney, Agent, or Firm* — Lando & Anastasi, LLP

(57) ABSTRACT

A system and method is provided that provides an early indication of consensus of opinion among a number of users regarding an event or observation indicated by a user. Such an opinion may be interesting to an information consumer, who may be interested in determining the outcome of the consensus relating to the event or observation, or may otherwise desire to perform surveillance or survey of a particular issue or subject. Such recognition of early events or observations may be useful in different areas, such as healthcare, finance, etc., where initial observations, if provided early, allow resulting decisions to be made much earlier. The opinion may, for instance, be used as an early indicator of problem with a product, company, etc. that would permit an information consumer to perform an action at a much earlier point than if he/she relied on traditional sources of information. Thus, such opinion information may be invaluable as a tool for monitoring events.

28 Claims, 15 Drawing Sheets

U.S. PATENT DOCUMENTS

| | | |
|---|---|---|
| 6,021,403 A | 2/2000 | Horvitz |
| 6,027,112 A | 2/2000 | Guenther |
| 6,064,980 A | 5/2000 | Jacobi et al. |
| 6,078,906 A | 6/2000 | Huberman |
| 6,085,216 A | 7/2000 | Huberman |
| 6,102,797 A | 8/2000 | Kail |
| 6,112,186 A | 8/2000 | Bergh et al. |
| 6,115,718 A | 9/2000 | Huberman |
| 6,119,052 A | 9/2000 | Guenther |
| 6,165,069 A | 12/2000 | Sines |
| 6,186,502 B1 | 2/2001 | Perkins |
| 6,208,979 B1 | 3/2001 | Sinclair |
| 6,263,321 B1 | 7/2001 | Daughtery, III |
| 6,270,404 B2 | 8/2001 | Sines |
| 6,272,507 B1 | 8/2001 | Pirolli |
| 6,309,307 B1 | 10/2001 | Krause |
| 6,331,148 B1 | 12/2001 | Krause |
| 6,363,333 B1 | 3/2002 | Deco |
| 6,389,372 B1 | 5/2002 | Glance |
| 6,400,372 B1 | 6/2002 | Gossweiler |
| 6,415,368 B1 | 7/2002 | Glance |
| 6,441,817 B1 | 8/2002 | Gossweiler |
| 6,470,269 B1 | 10/2002 | Adar |
| 6,488,281 B2 | 12/2002 | Stupak |
| 6,505,174 B1 | 1/2003 | Keiser |
| 6,508,706 B2 | 1/2003 | Sitrick |
| 6,516,288 B2 | 2/2003 | Bagne |
| 6,571,234 B1 | 5/2003 | Knight |
| 6,581,027 B1 | 6/2003 | Sheer |
| 6,631,184 B1 | 10/2003 | Weiner |
| 6,631,451 B2 | 10/2003 | Glance |
| 6,647,371 B2 | 11/2003 | Shinohara |
| 6,651,985 B2 | 11/2003 | Sines |
| 6,656,047 B1 | 12/2003 | Tarantino |
| 6,658,393 B1 | 12/2003 | Basch |
| 6,722,974 B2 | 4/2004 | Sines |
| 6,751,574 B2 | 6/2004 | Shinohara |
| 6,767,213 B2 | 7/2004 | Fleishman |
| 6,834,811 B1 | 12/2004 | Huberman |
| 6,839,656 B1 | 1/2005 | Ackermann |
| 6,868,441 B2 | 3/2005 | Greene |
| 6,895,385 B1 | 5/2005 | Zacharia |
| 6,910,965 B2 | 6/2005 | Downes |
| 6,912,511 B1 | 6/2005 | Eliezer |
| 6,925,364 B1 | 8/2005 | Huberman |
| 6,963,848 B1 | 11/2005 | Brinkerhoff |
| 7,533,034 B2 | 5/2009 | Laurin et al. |
| 7,536,310 B2 | 5/2009 | Klausnitzer |
| 7,620,651 B2 | 11/2009 | Chea et al. |
| 7,634,546 B1 | 12/2009 | Strickholm et al. |
| 7,672,904 B2 | 3/2010 | Powell |
| 7,685,117 B2 | 3/2010 | Gross |
| 7,725,472 B2 | 5/2010 | Uchiyama |
| 2001/0020236 A1 | 9/2001 | Cannon |
| 2001/0031451 A1 | 10/2001 | Sander |
| 2001/0053991 A1 | 12/2001 | Bonabeau |
| 2001/0056392 A1 | 12/2001 | Daughtery |
| 2002/0016731 A1* | 2/2002 | Kupersmit ............... 705/10 |
| 2002/0029157 A1 | 3/2002 | Marchosky |
| 2002/0046157 A1 | 4/2002 | Solomon |
| 2002/0049738 A1 | 4/2002 | Epstein |
| 2002/0049792 A1 | 4/2002 | Wilcox |
| 2002/0069079 A1 | 6/2002 | Vega |
| 2002/0073009 A1 | 6/2002 | Hogg |
| 2002/0073174 A1 | 6/2002 | Mengerink et al. |
| 2002/0087496 A1 | 7/2002 | Stirpe et al. |
| 2002/0095305 A1 | 7/2002 | Gakidis et al. |
| 2002/0129332 A1 | 9/2002 | Svensson |
| 2002/0138529 A1 | 9/2002 | Yang-Stephens et al. |
| 2002/0147611 A1 | 10/2002 | Greene |
| 2002/0147670 A1 | 10/2002 | Lange |
| 2002/0147895 A1 | 10/2002 | Glance |
| 2002/0165745 A1 | 11/2002 | Greene |
| 2002/0165905 A1 | 11/2002 | Wilson |
| 2002/0169644 A1 | 11/2002 | Greene |
| 2002/0173984 A1 | 11/2002 | Robertson |
| 2002/0174052 A1 | 11/2002 | Guler |
| 2002/0174191 A1 | 11/2002 | Robertson |
| 2002/0178026 A1 | 11/2002 | Robertson |
| 2002/0194113 A1 | 12/2002 | Lof et al. |
| 2002/0194226 A1 | 12/2002 | Sheth |
| 2002/0198032 A1 | 12/2002 | Sitrick |
| 2002/0198299 A1 | 12/2002 | Matsunaga |
| 2002/0198734 A1 | 12/2002 | Greene |
| 2003/0004744 A1 | 1/2003 | Greene |
| 2003/0017439 A1 | 1/2003 | Rapoza |
| 2003/0028467 A1 | 2/2003 | Sanborn |
| 2003/0028469 A1 | 2/2003 | Bergman et al. |
| 2003/0036963 A1 | 2/2003 | Jacobson |
| 2003/0041012 A1 | 2/2003 | Grey et al. |
| 2003/0046123 A1 | 3/2003 | Chen |
| 2003/0055773 A1 | 3/2003 | Guler |
| 2003/0069830 A1 | 4/2003 | Morano |
| 2003/0074166 A1 | 4/2003 | Jackson |
| 2003/0078829 A1 | 4/2003 | Chen |
| 2003/0115164 A1 | 6/2003 | Jeng |
| 2003/0126061 A1 | 7/2003 | Brett et al. |
| 2003/0126097 A1 | 7/2003 | Zhang |
| 2003/0135441 A1 | 7/2003 | Ginsberg |
| 2003/0135445 A1 | 7/2003 | Herz et al. |
| 2003/0167324 A1 | 9/2003 | Farnham |
| 2003/0172067 A1 | 9/2003 | Adar |
| 2003/0186243 A1 | 10/2003 | Adamic |
| 2003/0190045 A1 | 10/2003 | Huberman |
| 2003/0208407 A1 | 11/2003 | Dawson |
| 2003/0233274 A1 | 12/2003 | Urken et al. |
| 2003/0236738 A1 | 12/2003 | Lange |
| 2004/0002891 A1 | 1/2004 | Chen |
| 2004/0026858 A1* | 2/2004 | Murphy et al. ............... 273/254 |
| 2004/0030525 A1 | 2/2004 | Robinson et al. |
| 2004/0049447 A1 | 3/2004 | Keiser |
| 2004/0049473 A1 | 3/2004 | Gower |
| 2004/0073443 A1 | 4/2004 | Gabrick et al. |
| 2004/0088242 A1 | 5/2004 | Ascher |
| 2004/0107180 A1 | 6/2004 | Yoshida |
| 2004/0111467 A1 | 6/2004 | Willis |
| 2004/0117203 A1 | 6/2004 | Brand |
| 2004/0133463 A1* | 7/2004 | Benderev ............... 705/10 |
| 2004/0139031 A1 | 7/2004 | Amaitis |
| 2004/0148245 A1 | 7/2004 | Chen |
| 2004/0153375 A1 | 8/2004 | Mukunya |
| 2004/0162751 A1 | 8/2004 | Tsyganskiy et al. |
| 2004/0176994 A1 | 9/2004 | Fine |
| 2004/0181376 A1 | 9/2004 | Fables |
| 2004/0186738 A1 | 9/2004 | Reisman |
| 2004/0205065 A1* | 10/2004 | Petras et al. ............... 707/5 |
| 2004/0236625 A1 | 11/2004 | Kearon |
| 2004/0236637 A1 | 11/2004 | Tatge |
| 2004/0236661 A1 | 11/2004 | Benning |
| 2004/0236817 A1 | 11/2004 | Huberman |
| 2005/0021461 A1 | 1/2005 | Flake |
| 2005/0027612 A1* | 2/2005 | Walker et al. ............... 705/26 |
| 2005/0055337 A1 | 3/2005 | Bebo |
| 2005/0060245 A1 | 3/2005 | Hoffman |
| 2005/0060283 A1 | 3/2005 | Petras et al. |
| 2005/0066241 A1 | 3/2005 | Gross |
| 2005/0080655 A1 | 4/2005 | Sengir |
| 2005/0090231 A1 | 4/2005 | Huberman |
| 2005/0095003 A1 | 5/2005 | Huberman |
| 2005/0096922 A1 | 5/2005 | Huberman |
| 2005/0096973 A1 | 5/2005 | Heyse |
| 2005/0119963 A1 | 6/2005 | Ko |
| 2005/0131746 A1 | 6/2005 | Beausoleil |
| 2005/0131777 A1 | 6/2005 | Davidson |
| 2005/0131794 A1 | 6/2005 | Lifson |
| 2005/0132305 A1 | 6/2005 | Guichard |
| 2005/0138070 A1 | 6/2005 | Huberman |
| 2005/0154639 A1 | 7/2005 | Zetmeir |
| 2005/0160020 A1 | 7/2005 | Asher |
| 2005/0165669 A1 | 7/2005 | Montanaro |
| 2005/0171878 A1 | 8/2005 | Pennock |
| 2005/0177387 A1 | 8/2005 | Mojsa |
| 2005/0198299 A1 | 9/2005 | Beck |
| 2005/0256756 A1 | 11/2005 | Lam |
| 2005/0256800 A1 | 11/2005 | Hogg |
| 2005/0267807 A1 | 12/2005 | Bentley |
| 2005/0272087 A1 | 12/2005 | Adamic |

| | | | |
|---|---|---|---|
| 2005/0278371 A1 | 12/2005 | Funk | |
| 2005/0283395 A1 | 12/2005 | Lesandrini et al. | |
| 2005/0289265 A1 | 12/2005 | Illowsky | |
| 2006/0004653 A1 | 1/2006 | Strongin | |
| 2006/0020628 A1 | 1/2006 | Huberman | |
| 2006/0106627 A1 | 5/2006 | Al-Nujaidi | |
| 2006/0173838 A1 | 8/2006 | Garg et al. | |
| 2006/0282304 A1 | 12/2006 | Bedard et al. | |
| 2007/0294127 A1 | 12/2007 | Zivov | |

FOREIGN PATENT DOCUMENTS

| | | | |
|---|---|---|---|
| EP | 1320058 A1 | 6/2003 | |
| EP | 1416413 A2 | 5/2004 | |
| EP | 1473654 A1 | 11/2004 | |
| JP | 04355616 | 12/2004 | |
| JP | 05196752 | 7/2005 | |
| WO | 98/33135 A1 | 7/1998 | |
| WO | WO 9946719 A1 | 9/1999 | |
| WO | WO 0052622 A1 | 9/2000 | |
| WO | WO 0103046 A1 | 1/2001 | |
| WO | WO 0176120 A3 | 2/2001 | |
| WO | WO 0205123 A2 | 1/2002 | |
| WO | WO 03096262 A2 | 11/2003 | |
| WO | WO 2004034210 A2 | 4/2004 | |
| WO | WO 2004068318 A2 | 8/2004 | |
| WO | WO 2004074964 A2 | 9/2004 | |
| WO | WO 2004112604 A2 | 12/2004 | |
| WO | WO 2005003928 A2 | 1/2005 | |
| WO | WO 2005010714 A2 | 2/2005 | |
| WO | WO 2005069978 A2 | 8/2005 | |
| WO | WO 2005098612 A1 | 10/2005 | |
| WO | WO 2005106731 A1 | 11/2005 | |

OTHER PUBLICATIONS

Robin Hanson, Eliciting Objective Probabilities via Lottery Insurance Games, 2005.
Pan, Zuohong; Liu, Xiaodi; Mejabi, Olugbenga, Neural-Fuzzy system for forecasting, 1997.
Berg, J. E.; Rietz, T. A., Prediction markets as decision support systems, 2003.
Barabasi, A. L.; Jeong, H.; Neda, Z.; Ravasz, E.; Schubert, A.; Vicsek, T., Evolution of the social network of scientific collaborations, 2002.
Fukumoto, Takashi; Funabashi, Motohisa; Homma, Koichi; Kato, Hiromitsu; Kawakami, Ken-Ichiroh; Sasaki, Toshiro; Sato, Yoshinori; Yano, Kojin, Systems technologies for the ubiquitous society, 2005.
Marin, F. J.; Garcia-Lagos, F.; Joya, G.; Sandoval, F., Global model for short-term load forecasting using artificial neural networks, 2002.
Reynolds, R. G.; Kohler, T. A.; Kobti, Z., The effects of generalized reciprocal exchange on the resilience of social networks: an example from the prehispanic Mesa Verde region, 2003.
Yulmetyev, R.; Emelyanova, N.; Demin, S.; Gafarov, F.; Hanggi, P.; Yulmetyeva, D., Fluctuations and noise in stochastic spread of respiratory infection epidemics in social networks, 2003.
Guardiola, X.; Diaz-Guilera, A.; Perez, C. J.; Arenas, A.; Llas, M., Modeling diffusion of innovations in a social network, 2002.
Gurgen, Fikret S.; Okay, Nesrin; Yumlu, Serdar, A comparison of global, recurrent and smoothed-piecewise neural models for Istanbul stock exchange (ISE) prediction, 2005.
Huang, Chung-Yuan; Lin, Hsun-Cheng; Sun, Chuen-Tsai, Influence of local information on social simulations under the small-world model, 2004.
Pennock, David M., A dynamic pari-mutuel market for hedging, wagering, and information aggregation, 2004.
Chen, Kay-Yut; Fine, Leslie R.; Huberman, Bernardo A., Eliminating public knowledge biases in information-aggregation mechanisms, 2004.
Huiye Ma; Ho-fung Leung, An adaptive attitude bidding strategy for agents in continuous double auctions, 2005.
Gode, D. K.; Sundar, S., Double auction dynamics: structural effects of non-binding price controls, 2004.
Dooley, Mike; Dornfest, Rael; Flake, Gary W.; Hoffman, Havi; Kasturi, Tejaswi; Mangold, Bernard; Pennock, David M., The tech buzz game, 2005.
Rob Stocker, David Cornforth and T. R. J. Bossomaier, Network Structures and Agreement in Social Network Simulations, 2002.
Broihanne, Marie-Helene; Koessler, Frederic; Ziegelmeyer, Anthony, The favorite-longshot bias in sequential parimutuel betting with non-expected utility players, 2003.
Voss, M. S.; Howland, J. C., III, Financial modelling using social programming, 2003.
Carbo, J.; Molina, J. M.; Davila, J., Fuzzy referral based cooperation in social networks of agents, 2005.
Heng-Li Yang; Jih-Hsin Tang, Key user roles on web-based information systems requirements, 2005.
Robin Hanson, Combinatorial Information Market Design, 2005.
Luo Jia-Yuan; Ouyang Qi, Exploring the critical sensitivity in small-world networks, 2004.
Kim, D.-H.; Kahng, B.; Kim, D., Multi-component static model for social networks, 2004.
Janssen, M. A.; Jager, W., Simulating market dynamics: interactions between consumer psychology and social networks, 2003.
White, D. R.; Owen-Smith, J.; Moody, J.; Powell, W. W., Networks, fields and organizations: micro-dynamics, scale and cohesive embeddings, 2004.
Getoor, L.; Friedman, N.; Koller, D.; Taskar, B., Learning probabilistic models of link structure, 2003.
Newman, M. E. J., The structure and function of complex networks, 2003.
Li, K.; Thompson, S.; Wieringa, P. A.; Peng, J.; Duan, G. R., Neural networks and genetic algorithms can support human supervisory control to reduce fossil fuel power plant emissions, 2003.
Chowell, G.; Hyman, J. M.; Eubank, S.; Castillo-Chavez, C., Scaling laws for the movement of people between locations in a large city, 2003.
Nagurneya, A.; June Dong; Mokhtarian, P. L., Multicriteria network equilibrium modeling with variable weights for decision-making in the Information Age with applications to telecommuting and teleshopping, 2002.
Kempe, D.; Kleinberg, J.; Tardos, E., Influential nodes in a diffusion model for social networks, 2005.
Cebeci, Evin Dogan; Passmore, David L., Potential of idea futures markets in organizational decision-making for educational technology, 2004.
Wakolbinger, T.; Nagurney, A., Dynamic supernetworks for the integration of social networks and supply chains with electronic commerce: modeling and analysis of buyer-seller relationships with computations, 2004.
Weisbuch, G., Bounded confidence and social networks, 2004.
Diligenti, M.; Gori, M.; Maggini, M., Neural computation, social networks, and topological spectra, 2004.
Jyun-Cheng Wang; Chi-Lu Chen, An automated tool for managing interactions in virtual communities—using social network analysis approach, 2004.
Kim, J. Y.; Liao, J.; Lober, W. B., Applying social network analysis techniques to measure the efficacy of computerized medication records, 2002.
Borgatti, S. P.; Cross, R., A relational view of information seeking and learning in social networks, 2003.
Pearson, D. W.; McCartney, M., Dynamics of social networks: a deterministic approach, 2002.
Jin, E. M.; Girvan, M.; Newman, M. E. J., The Structure of growing social networks, 2001.
Elgazzar, A. S., A model for the evolution of economic systems in social networks, 2002.
Oliven, Kenneth; Rietz, Thomas A., Suckers Are Born but Markets Are Made: Individual Rationality, Arbitrage, and Market Efficiency on an Electronic Futures Market, 2004.
Garcia-Gonzalez, Javier; Gonzalez, Alicia Mateo; San Roque, Antonio Munoz, Modeling and forecasting electricity prices with input/output hidden Markov models, 2005.
Danilov, Dmitry; Magnus, Jan R., Forecast accuracy after pretesting with an application to the stock market, 2004.
Wago, H., Bayesian estimation of smooth transition GARCH model using Gibbs sampling, 2004.
Edmonds, Bruce; Moss, Scott, From KISS to KIDS—An 'anti-simplistic' modelling approach, 2005.

Calvi, Gianguglielmo; Pezzulo, Giovanni, Designing and implementing MABS in AKIRA, 2005.
Galan, Jose M.; Lopez-Paredes, Adolfo; Sauri, David, Urban water management with artificial societies of agents: The FIRMABAR simulator, 2005.
Athanasiadis, Ioannis N.; Mentes, Alexandros K.; Mitkas, Pericles A.; Mylopoulos, Yiannis A., A hybrid agent-based model for estimating residential water demand, 2005.
Anon, Wisdom of the crowd, 2005.
Chen, Yiling; Chu, Chao-Hsien; Mullen, Tracy; Pennock, David M., Information markets vs. opinion pools: An empirical comparison, 2005.
Feigenbaum, Joan; Fortnow, Lance; Pennock, David M.; Sami, Rahul, Computation in a distributed information market, 2003.
Chiu, Chih-Chou; Lee, Tian-Shyug, Neural network forecasting of an opening cash price index, 2002.
Gimpel, H.; Makio, J.; Weinhardt, C., Multi-attribute double auctions in financial trading, 2005.
Shubik, M., A double auction market: teaching, experiment, and theory, 2005.
Fortnow, Lance; Kilian, Joe; Pennock, David M.; Wellman, Michael P., Betting boolean-style: A framework for trading in securities based on logical formulas, 2003.
Chen, Kay-Yut; Fine, Leslie R.; Huberman, Bernardo A., Forecasting uncertain events with small groups, 2001.
Se-Hak Chun; Kyoung-Jae Kim; Kim, S. H., Chaotic analysis of predictability versus knowledge discovery techniques: case study of the Polish stock market, 2002.
Bengio, Yoshua; Ducharme, Rejean; Lauzon, Vincent-Philippe, Experiments on the application of IOHMMs to model financial returns series, 2001.
Ghoshray, S., Efficient neural network model to predict stock market by using modified conditional density estimation, 1996.
Joyce Berg, Forrest Nelson and Thomas Rietz, Accuracy and Forecast Standard Error of Prediction Markets, 2003.
Joanna Glasner, Bettors: Election Will Be Tight, 2004.
University of Iowa News Release, IEM Predicts Google Post-IPO Price, 2004.
CBS News.com, The Crowd Knows Best, 2006.
Emile Servan-Schreiber, Presidential Reality Check, An Assessment of NewsFutures' 2004 US Election Prediction Markets, 2004.
James Surrowiecki, Smarter Than the CEO, 2004.
Ajit Kambil, You Can Bet on Idea Markets, 2003.
A. Grabowski and R.A. Kosinski, The Sis Model of Epidemic Spreading in a Hierarchical Social Network, 2004.
John Dvorak, ABC News: Two Wrongs Make a Right, date printed Jan. 26, 2006.
Javier Carbo, Jesus Garcia, and Jose M. Molina, Contribution of Referrals in a Reputation Model Based on Kalman Filtering vs. Fuzzy Sets, 2006.
Robin Hanson, Idea Futures, How Making Wagers on the Future Can Make it Happen Faster, Wired Magazine 1995, printed on Feb. 6, 2007.
Kay-Yut Chen and Charles R. Plott, Information Aggregation Mechanisms: Concept, Design and Implementation for a Sales Forecasting Problem, 2002.
Robin Hanson, Mark James, Sean Morgan, The Story of the Idea Futures Web Site, 1995, printed on Feb. 6, 2007.
Daniel Akst, Wagering on the Internet, 1996.
Terry Johnson, Alberta Report, A Real Marketplace of Ideas, Calgary Researchers Are Proving That Thoughts Could be Traded like Hog Bellies, Alberta Report, 1995, printed on Feb. 6, 2007.
Robin Hanson, The Policy Analysis Market (and FutureMAP) Archive, 2006, printed on Feb. 6, 2007.
Justin Lahart, CNN Money, Future Imperfect, 2003, printed on Feb. 6, 2007.
Noah Shachtman, Wired News, the Case for Terrorism Futures, 2003, printed on Jan. 19, 2006.
Hal R. Varian, A Good Idea with Bad Press, 2003, printed on Jan. 19, 2006.
James Surowiecki, The New Yorker, The Talk of the Town, The Financial Page, Decisions, Decisions, 2003, printed on Feb. 6, 2007.
Robin Hanson, Eliciting Objective Probabilities via Lottery Insurance Games.
T. Tanaka, T. Kurihara and M. Inoue, Dynamics of a Hogg-Huberman Model with Time-Dependent Reevaluation Rate, 2004.
Robin D. Hanson, Decision Markets, 1999.
Emile Servan-Schreiber, Justin Wolfers, David M. Pennock, Brian Galebach, Prediction Markets: Does Money Matter? 2004.
Joyce Berg, Robert Forsythe, Forrest Nelson, Thomas Rietz, Results From a Dozen Years of Election Future Markets Research, 2000.
University of Iowa News Release, Iowa Electronic Markets Forecasted Bush Win in Presidential Election, 2006, printed on Jan. 19, 2006.
The Washington Stock Exchange, Welcome to the Future of Political Forecasting!, 2006.
www.simonexchange.org, The Simon Exchange, Quantifying the Current Consensus, 2006.
www.ideosphere.com, "The Foresight Exchange Prediction Market," pages from website "Home," "FAQ," "Welcome," "Rules," printed Feb. 7, 2007.
Hal R. Varian, The New York Times, A Market Approach to Politics, Economic Scene, May 8, 2003.
www.simonexchange.org, Julian L. Simon, Markets Similar to the Simon Market, 2006.
www.intrade.com, Application Programmable Interface (API), 2006.
www.intrade.com, Trade Notifications, Dec. 14, 2004, printed on Feb. 8, 2006.
www.intrade.com, New Financial Contracts, Dec. 16, 2004, printed on Feb. 8, 2006.
Barbara Kiviat, The End of Management, 2004.
www.intrade.com, About Intrade, 2006.
www.intrade.com, How does it work?, printed on Feb. 8, 2006.
www.hedgestreet.com, Market Overview, HedgeStreet: The Future of Risk, printed on Feb. 8, 2006.
www.ideosphere.com, Foresight Exchange Awards and Press, printed Feb. 6, 2007.
www.poolitics.com, Science/Technology, Feb. 7, 2006.
www.poolitics.com, About Poolitics, printed Feb. 8, 2006.
http://answers.google.com/answers/faq.html, Google Answers: Frequently Asked Questions, printed on Jan. 26, 2006.
The Buzz Game Press Release, newsfutures Prediction Markets, Mar. 15, 2006, printed on Feb. 6, 2007.
Bo Cowgill, Putting Crowd Wisdom to Work, 2005.
David M. Pennock, Mike Dooley, Tejaswi Kasturi, Hongyu Yao, Tech Buzz Game, Yahoo!Research, Mar. 14, 2006.
The Tech Buzz Game, IT Systems Perspectives, IEEE, Jul. 2005.
BusinessWeek Online, The Power of Us, Jun. 20, 2005.
www.innocentive.com/faq.html "Innocentive," pages from website printed on Feb. 6, 2007.
www.tradesports.com, "Tradesports," pages printed from website, "FAQ: Most Asked," "Trading," "Home," printed Feb. 7, 2007.
www.wsex.com, "World Sports Exchange," pages from website "Frequently Asked Questions," "Home," printed Feb. 6, 2007.
www.hsx.com, "Hollywood Stock Exchange," pages printed from website, "Home," "About," "Tell Me More," on Feb. 6, 2007.
www.cantorindex.co.uk/index.jsp "Cantor Index," pages printed from website, "Home," and "About Cantor Index" on Feb. 6, 2007.
http://ems.ubc.ca/index.php, "Election Stock Market" pages printed from website, "Home" and "About this Market" on Feb. 6, 2007.
www.imw.tuwien.ac.at/apsm, "Austrian Political Stock Markets/Austria Electronic Markets" pages from website printed on Feb. 6, 2007.
David M. Pennock, Steve Lawrence, C. Lee Giles and Finn Arup Nielsen, The Power of Play: Efficiency and Forecast Accuracy in Web Market Games, 2001.
www.biz.uiowa.edu/iem, "Iowa Electronic Markets," pages from website "Home," "About the IEM," and "FAQ" printed on Feb. 6, 2007.
www.inklingmarkets.com, "Markets by Inkling," pages from website "Home," "What are Prediction Markets," and "How Inkling Works" printed on Feb. 6, 2007.
www.Riffs.com, "Riffs" pages from website "Home" and "Help" printed on Feb. 6, 2007.

http:/us.newsfutures.com/home/home.html/home.html, "Newsfutures Prediction Markets," pages from website "Home" and "Learn More" printed on Feb. 6, 2007.

www.motorsport.com/ "Motors Sports.com" pages from website "Home," "Compete," and "Rules" printed on Feb. 6, 2007.

David M. Pennock, Steve Lawrence, Finn Arup Nielsen, C. Lee Giles, Extracting Collective Probabilistic Forecasts from Web Games, 2001.

Robin Hanson and Ryan Oprea, Manipulators Increase Information Market Accuracy, 2004.

Hal R. Varian, Can Markets Be Used to Help People Make Nonmarket Decisions?, 2003.

Wikipedia:About, http://en.wikipedia.org/wiki/Wikipedia:About, pp. 1-21.

Wikipedia:Consensus, http://en.wikipedia.org/wiki/Wikipedia:Consensus, pp. 1-9.

Kostas Kafentzis, et al., "Knowledge Marketplaces: Strategic Issues and Business Models," 8 Journal of Knowledge Management 130-146 (2004).

Virginia Dignum & Frank Dignum, "The Knowledge Market: Agent-Mediated Knowledge Sharing," 2691 Lecture Notes in Artificial Intelligence 168-179 (2003).

Business Wire, "Demand Ventures Announces Knexa.com the World's First Online Knowledge Auction," Aug. 13, 1999, accessed at http://www.highbeam.com/doc/1G1-55434937.html.

Business Wire, "Demand Ventures Announces First Online Knowledge Auction to Provide New Digital Self Publishing Forum; Demand Launches Knex.com Preview Web Site," Sep. 8, 1999, accessed at http://findarticles.com/p/articles/mi_m0EIN/is_1999_Sept_8/ai_55687690/.

Office Action, dated Feb. 25, 2011.
Office Action, dated Aug. 17, 2010.
Office Action, dated Jan. 25, 2010.
Office Action, dated Jan. 21, 2011.
Office Action, dated May 26, 2010.
Office Action, dated Dec. 23, 2010.
Office Action, dated Apr. 15, 2010.
Office Action dated May 11, 2011, issued in U.S. Appl. No. 11/483,149.

Wikipedia:About, http://en.wikipedia.org/wiki/Wikipedia:About, pp. 1-21, printed Jan. 6, 2010.

Wikipedia:Consensus, http://en.wikipedia.org/wiki/Wikipedia:Consensus, pp. 1-9, printed Jan. 6, 2010.

Supplementary European Search Report for European Patent Application No. 06786439.7, dated Aug. 18, 2010.

Examiner's First Report on Australian Patent Application No. 2006269467, dated Oct. 13, 2010.

Non_Final_Office_Action, issued in U.S. Appl. No. 11/483,195, filed Jun. 30, 2011.

* cited by examiner

METHOD AND APPARATUS FOR CONDUCTING AN ONLINE INFORMATION SERVICE

RELATED APPLICATIONS

This application claims priority under 35 U.S.C. §119(e) to U.S. Provisional Application Ser. No. 60/697,213, entitled "SYSTEM, METHOD AND APPARATUS FOR ASSEMBLING IDEAS, PREDICTING OUTCOMES, GENERATING REVENUE, AND PROCESSING DATA IN A SELECTIVE MECHANISM," filed on Jul. 7, 2005, which is herein incorporated by reference in its entirety.

BACKGROUND OF THE INVENTION

1. Field of the Invention

The field of the invention relates to online information systems, and more specifically, to online systems having communities of users that share ideas.

2. Discussion of the Related Art

The phenomenon of like-minded people going online to share ideas, trade, or compete is well-accepted. In moving from the physical world to the digital one, users create virtual "communities" where they are bound together by the similarities of their interests or activities, rather than the proximity of their location. These communities can take any number of forms, the most basic being discussion groups, chat rooms, blogs, and forums, which are, in effect, offline communities reincarnated online.

Social network theory (SNT) describes how individuals within a community interact with one another and the community as a whole. Prediction markets (PM) are a newer discipline that have shown that individuals competing with one another for real or hypothetical rewards collectively can make more accurate predictions than organized bodies, who might have access to higher quality information. Additionally, studies have shown that a modest number of users is sufficient to obtain a high degree of accuracy. Various ideas relating to Social Network Theory (SNT) and the Prediction Markets (PM) are disclosed in detail below.

Social Network Theory (SNT)

Social network theory illustrates the ability of persons to influence one another. What might appear as random conversations between people in the off-line world, when viewed on-line, can show clear patterns of influence. In practice, people relate to one another in different ways. For example, certain people are more promiscuous in their interactions, speaking with several different people simultaneously, while others interact with fewer users, but perhaps more frequently. One of the reasons SNT is studied is that by understanding the mappings connecting an individual to others, one can evaluate the social and or professional "capital" of that individual. In practice, this social capital refers to the network position of the person and reflects their ability to draw on the resources available to the members of the network. Human social networks comprise individuals that interact with each other through family, work, recreation, community, social, and other activities. Common to these interactions is the establishment of relationships that rely on patterns of connection and information exchange processes.

An effective on-line system mimics these interactions. Individuals are able to re-identify each other in the system, as well as identify all the additional members that the system allows them to come in contact with. Individuals influence each other directly, through, for example, persuasion, orders, providing information and acting as role models, and they adjust or modify their behavior in consequence of their interaction with other individuals, and the environment in which they operate. Communication, and thus social comparison, depends on the individuals. New issues promote discussion and comparison as agreement patterns emerge.

Prediction Markets (PM)

Markets are considered to be a method of allocating resources among competing uses. Markets can also be used when there is an absence of an arbiter with helpful information. Prices ensure that the different agents competing for access have a common standard for comparison across different choices. The market clearing process ensures that each resource is assigned to its best use. Different market designs satisfy different purposes.

Continuous double auction markets provide goods on demand to buyers who are willing to pay the going rate, while call or options markets improve prices for buyers and sellers when time is not the most crucial factor, allowing for hedging and risk allocation. When a plurality of buyers have needs for different goods, which also are interdependent, combination markets may be necessary.

Prediction markets are a form of market in which the goods being traded are securities whose values are determined by the outcomes of future events. The securities are structured so that trading between buyers and sellers causes the price to reflect the probability of the underlying event. When a trader sees a market price (probability) that is less than her expected probability for the event, she will see a profit opportunity in buying more, thus likely driving the price up. The new price reflects a higher probability to others monitoring the market.

Prediction markets have been applied to a variety of problems and questions. Several variations on the basic idea have been described, making it possible to find answers for many different types of questions, or apply the concept in a wider set of circumstances. New variations of the original prediction market concept suggested ways to support conditional bets, which would elicit estimates about the relative chances that alternative approaches would have of achieving certain outcomes. In these variations, pari-mutuel style betting is combined with standard double-auction prediction markets to increase the liquidity of the markets at the cost of having prices that don't directly reflect probabilities.

Several automated market makers have proposed different ways to improve the predictive ability of markets with small numbers of traders ("thin markets"). In markets for general commodities, similar approaches can make thin markets more liquid and make it easier for traders to find counterparties to trade with. Key, however, is that most markets have been limited to questions of broad interest like national elections and the outcome of professional sporting events. This limitation reflects a short falling of conventional prediction markets, that their predictive capability is a direct function of their liquidity, or ultimately their number of active users.

SUMMARY OF THE INVENTION

According to one aspect of the present invention, a system and method is provided that provides an early indication of consensus of opinion among a number of users regarding an event or observation indicated by a user. Such an opinion may be interesting to a consumer of information, who may be interested in determining the outcome of the consensus relating to the event or observation. Such recognition of early events or observations may be useful in different areas, such as healthcare, finance, etc., where initial observations, if provided early, allow resulting decisions to be made much earlier. The opinion may, for instance, be used as an early indicator of problem with a product, company, new insight on a disease, awareness of a disease outbreak, etc. Such an opinion or observation may permit an investor or other information consumer to take a position or take action at a much earlier point than if s/he relied on traditional sources of information. Thus, such opinion information may be a valuable tool for monitoring events.

Similarly, such a tool may be also valuable for participants in the advancement of ideas, especially those that rely on collaboration between people (e.g., research) and consensus between observers. However, conventional social networking systems or other online communities are insufficient for determining what information is likely to be quality information versus a random or incorrect observation or prediction. That is, it is appreciated that such conventional systems are incapable of distinguishing quality data from noise.

Also, such networks do not provide proper incentive for experts to contribute quality information in particular subject areas that would be interesting to information consumers (e.g., corporations, equity traders, etc.). Further, prediction markets are insufficient for advancing original ideas and observations, as predictive events are defined in such systems by a system operator and users can only vote on the predictive events set forth by the system operator. Thus, such systems may not be used to submit and foster the ideas and observations originated by users.

According to one aspect of the present invention, a distributed system is provided for determining a consensus of opinion among users. According to one embodiment, the system may be capable of accepting original observations and opinions submitted by users. The system may adjudicate and provide incentives for users to make and vote on observations, opinions and/or predictive events.

Existing predictive markets and social networks are insufficient for such an application, for example, as they do not provide proper incentives for users to submit quality information and/or provide checks and balances to prohibit users from exploiting the system. To this end, a system is provided that provides incentives and disincentives for users to cooperatively contribute observations and opinions to an online system for the purpose of early detection of consensus.

Further, according to another aspect of the present invention, it is appreciated that existing predictive markets and social networks require a moderator to create issues to be voted on and adjudicate them. However, according to one aspect of the present invention, users are permitted to define the issues being voted on. Because users create the issues, an online system that permits users to define the issues can function as an early warning system, whereby users having an observation can submit the observation to the system. Such users may be in a position to make the observation at an earlier point than traditional methods of monitoring issues (e.g., waiting for a journal article to come out on a particular issue, an FDA action in response to an issue, etc.), and thus the early observation may be useful.

According to one aspect of the present invention, a method is provided for determining consensus of opinion relating to an observation, opinion, and/or a predictive event, used herein interchangeably as set forth by a user. A user may submit an idea to an online system, and other users may submit their opinion of the observation. In one embodiment, users of the system may be provided incentives to both create their own observations as well as provide their opinions on observations created by other users. These incentives may be in the form of money paid to users for their observations and opinions of observations.

According to one aspect of the present invention, users submit observations in the form of "tickets" to an online system, the tickets including information relating to the observation or opinion. These tickets may be, for instance, holders for an observation or opinion in the online system. These tickets may be displayed to other users of the online system, where these other user users may view and cast a "vote" expressing their opinion on the observation.

The system may permit a number of users to vote on the ticket, and, based on the voting performed by users, determine whether there is consensus forming among the users regarding the observation or opinion. In this manner, the ticket and its associated observation or opinion may be submitted for feedback to the online system. There, the observation or opinion may be corroborated, refuted, and/or explained by others.

Other users may, for example, corroborate or otherwise agree with an observation, modify the observation, or disagree with the observation. In one example system, a user may be permitted to "agree" or "disagree" with an observation or opinion. That is, the user may be permitted to submit either a positive or negative response.

In another example voting model, a user may be permitted to provide another response to the observation or opinion in addition to the binary yes/no, agree/disagree response model. The submitted response may be presented to other users as an option for response (e.g., in the form of a multiple choice selection), where other users can select the submitted response as their vote on the observation or opinion. In this way, users can propose new responses relating to the observation or opinion that can be voted on by other users.

In another example, users may be permitted to change their vote after placing their vote. For instance, it may be beneficial for an early voter to change their response upon receiving information that might lead the early voter to change their response. For instance, if the early voter submits a vote that a particular drug prevents cancer, but later views a journal article including a study that shows that the drug does not prevent cancer, then the early voter may be permitted to change their vote in response to the additional information. Further, the early voter may be informed by the system of later responses (e.g., in the form of alternative responses provided by later users), which may cause the user to change their response.

Thus, according to one embodiment, the system may facilitate monitoring voting by later users, and if their voting or other observations (e.g., in the form of an alternative submitted response) changes the mind of the early voter, that voter may be permitted to change their vote. A change in voting may be permitted during the pendency of a ticket, allowing the consensus result to be a more accurate reflection of the users' opinions, and allows for earlier voters to change their vote in response to later-posted observations. Further, an information consumer may permitted to observe the voting process, and any voting trends that may arise during the pendency of the ticket. The system may also provide the information consumer key information relating to the ticket during the voting process, such as trends, alternative responses, or other information.

According to one aspect of the present invention, the tickets and the associated election is created and arbitrated by users rather than a system operator. That is, users (not an operator) create the issues which are decided on by the online user community. In this way, original observations usually made by people that are in the best position to report the observation are submitted to the system. Further, according to one embodiment, the system is configured to rapidly disseminate such observations to other users. Further, according to another embodiment, it is left to the user community to agree, disagree, or offer an alternative response to the observation and otherwise determine collectively among the user community any consensus of the observation. Also, the voting process may be monitored by the system, and length of the voting process may be varied depending on information relating to the opinions entered by users. Thus, in this way, the users both create and vote on the issues in the online system.

To foster such participation, various mechanisms may be used by the system to motivate users. For instance, monetary or any other type of value (e.g., points) may be attributed to tickets, which may increase or decrease based on the opinions submitted by users. Thus, if other users agree with an observation, a consensus measurement (referred to herein as a signal strength) of the ticket is increased. Similarly, if users disagree with an observation, the consensus measurement of the ticket is decreased. Whether other users agree or disagree with the observation, a ranking of the user originating the ticket may be affected. Other mechanisms may be used by the system to encourage desired participation (e.g., submitting opinions by particular users in their field of expertise, users encouraged to both create observation and express opinions) and to discourage undesired participation (e.g., gaming of the system, submission of non-unique observations, etc.). Further, the system may encourage users to submit tickets in particular subject areas to foster ideas in those areas (e.g., by valuing tickets and voting more highly in such areas). According to one embodiment, the system may use rules to provide such incentives and disincentives for user behavior.

According to one aspect of the present invention, an online system may be provided for users to submit observations, insights, and/or questions. Such observations, insights, and/or questions may be submitted in the form of tickets. Information consumers that desire to have exclusive access to voting results of a particular ticket may be permitted to bid on the ticket. Once a particular information consumer has agreed to pay a particular price for the voting results, that ticket is referred to herein as being cultivated.

Users may vote on a ticket until some predetermined criteria is reached. In one embodiment, a consensus determination is performed that indicates when the voting process is complete, and the ticket is closed. Consensus may be measured, for instance, using a parameter (referred to herein as signal strength) that determines whether the voting process is complete. Signal strength may be measured, for example, by the number of users responding to a particular ticket, the number of votes cast for a particular answer, or any combination of information associated with the ticket and/or statistic in voting on the ticket. In addition, the information consumer may be permitted to specify parameters that determine when signal strength is reached (e.g., when a particular number of users vote on the ticket, when a particular number of votes are received, when the ticket should close, etc.). The information consumer may be permitted to view voting results in real time, and may be provided exclusive access to the results after ticket closing. In one example, the exclusive access may be granted for a particular period of time, after which the results may be made available to other users of the online system.

Further, according to another aspect, it appreciated that conventional online predictive markets may run afoul of online gambling laws, including the United States. In particular, one of several obstacles faced by prediction markets is that the gambling laws in several jurisdictions are written broadly enough so that they can be construed to prohibit use of these markets with real money. Thus, according to one aspect of the invention, an online information brokering service is provided that permits users to define and place opinions regarding future outcomes, yet not impinge on U.S. gaming laws. In particular, users may be compensated for their opinions regarding predictive events without placing a wager. Rather, they are compensated if their opinion is correct, but not charged if their opinion is incorrect. Other non-monetary mechanisms (e.g., a ranking) may be used to reflect a user's ability to place correct opinions. Further, information consumers that purchase the opinion information (e.g., government officials, investors) are not wagering, because, according to one embodiment, the purchase of opinion information is completed independent of the outcome of the "ticket/s." Thus, neither action performed by the user or information consumer is a speculative wager.

According to another embodiment of the present invention, a system may be provided that permits users to associate classification information with tickets. For instance, users may be permitted to associate classification information such as "tags" in order to classify tickets to permit searching by the system, other users, programs, etc. Further, a computer system associated with the system may process tickets to create classifications for a ticket. In one example, the system may process one or more keywords associated with the ticket and classify the ticket using those keywords. Further, the computer system may be adapted to search one or more databases to locate similar keywords with which the ticket may be associated. After such classifications are defined, the ticket may be located using such classification.

According to another aspect of the present invention, tickets may be identified in the system and matched to particular users based on their classification information. For instance, a ticket may be classified by a submitting user, along with any classifications assigned by the system, and based on the assigned classifications, the submitting user is displayed tickets already submitted to the system having similar classifications. In this way, the user may more easily locate similar tickets. Tickets may be associated with users in other ways, such as, for example, identifying tickets to users that voted on similar tickets, identifying tickets to users who are identified as experts in a particular area, identifying tickets to particular consumers of ticket information that may have previously bid on such information, among others.

According to one aspect of the present invention, a method is provided for conducting an online information brokering service. The method comprises acts of permitting a creation of a ticket by at least one user, the ticket comprising at least one observation generated by a user, presenting, by a computer system, the ticket to at least one other user, and accepting, from the at least one other user, an opinion of the at least one other user regarding the at least one ticket. According to one embodiment of the invention, the method further comprises an act of presenting, to the at least one user, an interface that permits the at least one user to selectively create the ticket. According to another embodiment, the method further comprises an act of presenting, to the at least one other user, an interface that permits the at least one other user to submit an opinion relating to the created ticket. According to another embodiment, the method further comprises an act of providing for the at least one other user to submit a vote with respect to the observation. According to another embodiment, the method further comprises an act of providing for the at least one other user to submit an alternative opinion with respect to the observation.

According to one embodiment of the invention, the computer system accepts a plurality of user opinions relating to the created ticket. According to another embodiment, a length of time by which the computer system accepts the plurality of user opinions is determined based on a determination of consensus among the plurality of user opinions. According to another embodiment, the length of time is determined without intervention by an operator of the online information brokering service.

According to another embodiment, the method further comprises an act of determining a value of the ticket. According to another embodiment, the act of determining the value of the ticket comprises an act of determining the value by a bid process. According to another embodiment, the bid process includes an act of permitting at least one information consumer to bid on the ticket. According to another embodiment, the act of determining the value of the ticket further comprises an act of classifying the observation in a predetermined class, the predetermined class having a predetermined value, and determining the value of the ticket based on the predetermined value of the predetermined class.

According to one embodiment of the invention, the method further comprises an act of providing an incentive, by an operator of the online information brokering system, to users to submit tickets relating to a particular predetermined class. According to another embodiment, the method further comprises an act of permitting the at least one user to send the created ticket to the at least one other user. According to another embodiment, the method further comprises an act of sending the created ticket to a group of users to which the at least one user has a relationship. According to another embodiment, the act of determining a value of the ticket further comprises an act of valuing the ticket at a higher value than a later-created ticket that relates to a similar subject as the ticket. According to another embodiment, the method further comprises acts of permitting a user to create a proposed ticket and determining whether the proposed ticket is similar to the created ticket.

According to one embodiment of the invention, the method further comprises an act of presenting to the user, the created ticket if the proposed ticket is similar to the created ticket. According to another embodiment, the method further comprises an act of rewarding the at least one other user based on the opinion of the at least one other user regarding the at least one ticket. According to another embodiment, the method further comprises an act of determining a reward based on a ranking of the at least one other user.

According to another embodiment, the method further comprises an act of determining the ranking of the at least one other user. According to another embodiment, the act of determining the ranking of the at least one other user further comprises an act of determining the ranking based on a history of voting of the at least one other user. According to another embodiment, the act of determining the ranking of the at least one other user further comprises an act of determining the ranking based on an ability of the at least one other user to vote for a correct outcome of the ticket. According to another embodiment, the act of determining the ranking of the at least one other user further comprises an act of reducing the ranking if the at least one other user places a vote for an incorrect outcome of the ticket.

According to one embodiment of the invention, the act of determining the ranking of the at least one other user further comprises an act of determining the ranking of the at least one other user based on a ratio of a number of agreeing votes and a number of disagreeing votes received after the opinion of the at least one other user has been made. According to another embodiment, the act of determining the ranking of the at least one other user further comprises an act of rewarding an earlier vote more highly than a later vote on a same ticket.

According to another embodiment, the act of determining the ranking of the at least one other user further comprises an act of determining user income based on at least one of a group comprising a ranking of the user, a number of votes in agreement with the defined ticket, a weight of the defined ticket, a number of outstanding tickets, and a consensus quality parameter associated with the defined ticket. According to another embodiment, the method further comprises an act of conducting a bid process to determine a sale of opinion information associated with the ticket to a winning bidder. According to one embodiment, the method further comprises an act of displaying, to the winning bidder, the opinion information in a display of a computer system.

According to one embodiment of the invention, the act of determining the value of the ticket includes an act of conducting a voting process among a plurality of users, wherein a result of the voting process in used in the act of determining the value of the ticket. According to another embodiment, the act of determining the value of the ticket includes an act of determining a market value of opinion information related to the ticket. According to another embodiment, the method further comprises an act of determining a ranking of the at least one user. According to another embodiment, the act of determining the ranking of the at least one user further comprises an act of determining the ranking based on a history of voting of the at least one user. According to another embodiment, the act of determining the ranking of the at least one user further comprises an act of determining the ranking based on an ability of the at least one user to vote for a correct outcome of at least one ticket. According to another embodiment, the act of determining the ranking of the at least one user further comprises an act of reducing the ranking if the at least one user places a vote for an incorrect outcome of the at least one ticket.

According to one embodiment of the invention, the act of determining the ranking of the at least one user further comprises an act of determining the ranking of the at least one user based on a ratio of a number of agreeing votes and a number of disagreeing votes received after the opinion of the at least one user has been made. According to another embodiment, the act of determining the ranking of the at least one user further comprises an act of determining a weighting associated with the at least one user. According to another embodiment, the act of determining the weighting associated with the at least one user further comprises an act of weighting a value of the created ticket by the determined weighting. According to another embodiment, the act of determining the weighting associated with the at least one user further comprises an act of multiplying the value of the created ticket by the determined weighting to determine a weighted value of the ticket. According to another embodiment, the act of determining the weighting associated with the at least one user further comprises an act of determining an independent weighting depending on a classification of the ticket. According to another embodiment, the act of determining the weighting associated with the at least one user further comprises an act of maintaining a plurality of independent weightings for the at least one user, each independent weighting being associated with a particular classification.

According to one embodiment of the invention, the method further comprises an act of determining a reward to the at least one user including an act of reducing the value of the ticket by an amount paid to the at least one other user, the at least one other user having voted on the ticket. According to another embodiment, the method further comprises an act of determining a consensus of opinion among a plurality of users regarding the at least one observation of the ticket. According to another embodiment, the method further comprises an act of measuring at least one parameter associated with the ticket. According to another embodiment, the act of determining a consensus of opinion further comprises an act of determining the consensus of opinion based on the at least one measured parameter. According to another embodiment, the at least one measured parameter comprises a number of votes on the ticket received from users. According to another embodiment, the act of determining a consensus of opinion further comprises an act of determining a quality of the consensus of opinion. According to another embodiment, the act determining a quality of the consensus of opinion comprises an act of maintaining a quality parameter that indicates the quality of the consensus of opinion.

According to one embodiment of the invention, the method further comprises an act of increasing the quality parameter if it is determined that a plurality of users having a similar background have a similar opinion regarding the at least one observation of the ticket. According to another embodiment, the method further comprises an act of permitting the at least one user to send the created ticket to the at least one other user. According to another embodiment, the method further comprises an act of sending the created ticket to a group of users to which the at least one user previously sent a previously-created ticket. According to another embodiment, the method further comprises an act of ending a voting period of the ticket in response to the act of determining the consensus of opinion among the plurality of users. According to another embodiment, the method further comprises an act of displaying, to a consumer of the ticket, consensus information indicating the consensus of opinion among the plurality of users. According to another embodiment, the act of displaying is responsive to the act of ending a voting period of the ticket. According to another embodiment, the act of determining a consensus of opinion among a plurality of users regarding the at least one observation of the ticket is determined as a function of a number of votes received on the ticket.

According to one embodiment of the invention, the method further comprises an act of determining collusion between a plurality of users. According to another embodiment, the method further comprises an act of determining a repeated pattern of voting among the plurality of users. According to another embodiment, the act of determining a repeated pattern of voting among the plurality of users further comprises a determination of a distribution of voting among the plurality of users. According to another embodiment, the method further comprises an act of comparing the determined distribution of voting with a distribution of users. According to another embodiment, the distribution of user is organized by at least one of the group comprising location and organization.

According to another aspect of the present invention, a method is provided for conducting an online information brokering service. The method comprises acts of permitting a creation of a ticket by at least one user, the ticket comprising at least one observation generated by a user, presenting, by a computer system, the ticket to a plurality of users, accepting, from each of the plurality of users, a respective opinion regarding the ticket; and determining a consensus of opinion among a plurality of users regarding the at least one observation of the ticket. According to one embodiment of the invention, the computer system accepts a plurality of user opinions relating to the created ticket. According to another embodiment, a length of time by which the computer system accepts the plurality of user opinions is determined based on a determination of consensus among the plurality of user opinions. According to another embodiment, the method further comprises an act of measuring at least one parameter associated with the ticket. According to another embodiment, the act of determining a consensus of opinion further comprises an act of determining the consensus of opinion based on the at least one measured parameter. According to another embodiment, the at least one measured parameter comprises a number of votes on the ticket received from users. According to another embodiment, the act of determining a consensus of opinion further comprises an act of determining a quality of the consensus of opinion.

According to one embodiment of the invention, the act determining a quality of the consensus of opinion comprises an act of maintaining a quality parameter that indicates the quality of the consensus of opinion. According to another embodiment, the method further comprises an act of increasing the quality parameter if it is determined that a plurality of users having a similar background have a similar opinion regarding the at least one observation of the ticket. According to another embodiment, the method further comprises an act of determining the ranking of the at least one of the plurality of users. According to another embodiment, the method further comprises an act of permitting the at least one user to send the created ticket to the at least one of the plurality of users. According to another embodiment, the method further comprises an act of sending the created ticket to a group of users to which the at least one user previously sent a previously-created ticket. According to another embodiment, the method further comprises an act of sending the created ticket to a group of users, wherein the group of users includes a group of users identified as experts in a particular subject area. According to another embodiment, the method further comprises an act of determining a reward to the at least one of the plurality of users in response to the at least one of the plurality of users's opinion, the reward being based on a ranking of the at least one of the plurality of users. According to another embodiment, the method further comprises an act of determining the ranking of the at least one of the plurality of users.

According to one embodiment of the invention, the act of determining the ranking of the at least one of the plurality of users further comprises an act of determining the ranking based on a history of voting of the at least one of the plurality of users. According to another embodiment, the act of determining the ranking of the at least one of the plurality of users further comprises an act of determining the ranking based on an ability of the at least one of the plurality of users to vote for a correct outcome of the ticket. According to another embodiment, the act of determining the ranking of the at least one of the plurality of users further comprises an act of reducing the ranking if the at least one of the plurality of users places a vote for an incorrect outcome of the ticket. According to another embodiment, the act of determining the ranking of the at least one of the plurality of users further comprises an act of determining the ranking of the at least one of the plurality of users based on a ratio of a number of agreeing votes and a number of disagreeing votes received after the opinion of the at least one of the plurality of users has been made. According to another embodiment, the act of determining the ranking of the at least one of the plurality of users further comprises an act of rewarding an earlier vote more highly than a later vote on a same ticket.

According to one embodiment of the invention, the act of determining the ranking of the at least one of the plurality of users further comprises an act of determining user income based on at least one of a group comprising a ranking of the at least one user, a number of votes in agreement with the defined ticket, a weight of the defined ticket, a number of outstanding tickets, and a consensus quality parameter associated with the defined ticket. According to another embodiment, the method further comprises an act of ending a voting period of the ticket in response to the act of determining the consensus of opinion among the plurality of users. According to another embodiment, the method further comprises an act of displaying, to a consumer of the ticket, consensus information indicating the consensus of opinion among the plurality of users. According to another embodiment, the act of displaying is responsive to the act of ending a voting period of the ticket. According to another embodiment, the act of determining a consensus of opinion among a plurality of users regarding the at least one observation of the ticket is determined as a function of a number of votes received on the ticket. According to another embodiment, the method further comprises an act of determining a value of the ticket. According to another embodiment, the act of determining the value of the ticket comprises an act of determining the value by a bid process.

According to one embodiment of the invention, the bid process includes an act of permitting at least one information consumer to bid on the ticket. According to another embodiment, the act of determining the value of the ticket further comprises an act of classifying the observation in a predetermined class, the predetermined class having a predetermined value, and determining the value of the ticket based on the predetermined value of the predetermined class. According to another embodiment, the method further comprises an act of providing an incentive, by an operator of the online information brokering system, to users to submit tickets relating to a particular predetermined class. According to another embodiment, the method further comprises an act of conducting a bid process to determine a sale of opinion information associated with the ticket to a winning bidder. According to another embodiment, the method further comprises an act of displaying, to the winning bidder, the opinion information in a display of a computer system. According to another embodiment, the act of determining the value of the ticket includes an act of conducting a voting process among a plurality of users, wherein a result of the voting process in used in the act of determining the value of the ticket.

According to one embodiment of the invention, the act of determining the value of the ticket includes an act of determining a market value of opinion information related to the ticket. According to another embodiment, the method further comprises an act of determining a ranking of the at least one user. According to another embodiment, the method further comprises determining a value of the ticket based on the ranking of the at least one user. According to another embodiment, the ticket is created without intervention by an operator of the online information brokering service. According to another embodiment, the method further comprises an act of determining a quality of the observation of the ticket. According to another embodiment, the quality of the observation of the ticket is determined without intervention by an operator of the online information brokering service. According to another embodiment, the consensus of opinion is determined without intervention by an operator of the online information brokering service. According to another embodiment, the consensus of opinion is determined by voting by the plurality of users.

According to another aspect of the present invention, a method is provided for conducting an online information brokering service. The method comprises permitting a creation of a ticket by at least one user, the ticket comprising at least one observation generated by the at least one user, and accepting, from a plurality of users, a plurality of respective opinions regarding the ticket. According to one embodiment of the invention, the method further comprises an act of determining a rank of the at least one user. According to another embodiment, the method further comprises an act of determining a rank of each of the plurality of users.

According to another embodiment, the method further comprises an act of adjusting the rank of the at least one user based on the plurality of respective opinions regarding the ticket. According to another embodiment, the method further comprises an act of adjusting the rank of each of the respective users based on their ability to predict an outcome of the plurality of respective opinions regarding the ticket. According to another embodiment, the method further comprises an act of increasing the rank of the at least one user if the plurality of respective opinions regarding the ticket form a consensus of agreement with the observation of the ticket. According to another embodiment, the method further comprises an act of decreasing the rank of the at least one user if the plurality of respective opinions regarding the ticket do not form a consensus of agreement with the observation of the ticket. According to another embodiment, the method further comprises an act of decreasing the rank of the at least one user if the plurality of respective opinions regarding the ticket form a consensus of disagreement with the observation of the ticket.

According to one embodiment of the invention, the method further comprises an act of increasing the rank of at least one of the plurality of users if the at least one user correctly predicts the outcome of the plurality of respective opinions regarding the ticket. According to another embodiment, the method further comprises an act of decreasing the rank of at least one of the plurality of users if the at least one user incorrectly predicts the outcome of the plurality of respective opinions regarding the ticket. According to another embodiment, the method further comprises an act of determining a consensus of opinion among a plurality of users regarding the at least one observation of the ticket. According to another embodiment, the method further comprises acts of maintaining a plurality of tickets created by a plurality of users.

According to another embodiment, the method further comprises an act of limiting, for at least one user of the plurality of users, a number of opinions relating to the plurality of tickets that the at least one user of the plurality of users can enter. According to another embodiment, the method further comprises an act of linking, for the at least one user of the plurality of users, the number of opinions the at least one user of the plurality of users can enter to a number of tickets created by at least one user of the plurality of users. According to another embodiment, the method further comprises an act of limiting a number of tickets that can be created by the at least one user. According to another embodiment, the method further comprises an act of limiting a number of tickets that are outstanding from the at least one user. According to another embodiment, the method further comprises an act of providing an incentive to the at least one user if the ticket relates to an area of expertise of the at least one user.

According to one embodiment of the invention, the method further comprise an act of rewarding an earlier vote more highly than a later vote on a same ticket. According to another embodiment, the method further comprises acts of permitting a user to create a proposed ticket and determining whether the proposed ticket is similar to the created ticket. According to another embodiment, the method further comprises an act of presenting to the user, the created ticket if the proposed ticket is similar to the created ticket.

According to another aspect of the present invention, a method is provided for conducting an online information brokering service. The method comprises acts of permitting at least one user to define a prediction of an event, and accepting, from at least one other user, an opinion regarding the defined prediction, and compensating the at least one other user if the opinion is correct. According to one embodiment of the invention, the at least one user does not place a wager to qualify for being compensated. According to another embodiment, the prediction of the event is defined by the at least one user without intervention of an operator of the online information brokering service. According to another embodiment, the method further comprises an act of paying, by a information consumer, for opinion information relating to the prediction of the event. According to another embodiment, the act of paying does not depend on whether the prediction of the event is correct. According to another embodiment, the act of paying is independent of the outcome of the event. According to another embodiment, the method further comprises an act of determining a value of the opinion information. According to another embodiment, the method further comprises an act of conducting a bid process among a plurality of information consumers, and wherein a result of the bid process determines the value of the opinion information. According to another embodiment, the method further comprises an act of compensating the at least one user if the opinion is correct.

According to another aspect of the present invention, a method is provided for conducting an online information service. The method comprises acts of collecting opinion information from a plurality of users, the opinion information relating to an event defined by at least one user, and providing the opinion information to at least one information consumer. According to one embodiment of the invention, the method further comprises an act of defining a trigger by the at least one information consumer, the trigger being activated by at least one parameter associated with the event defined by the at least one user. According to another embodiment, the method further comprises an act of activating the trigger upon the creation of an event including the at least one parameter. According to another embodiment, the event relates to a product, and wherein the trigger, when activated, provides an indication to the at least one information consumer. According to another embodiment, the method further comprises providing an indication to the at least one information consumer that the trigger was activated. According to another embodiment, the method further comprises acts of compensating the plurality of users for the opinion information and selling the opinion information to the at least one information consumer. According to another embodiment, the method further comprises an act of conducting a bid process to determine the at least one information consumer to which the opinion information is sold. According to another embodiment, the method further comprises an act of determining a consensus of the collected opinion information. According to another embodiment, the act of providing the opinion information to at least one information consumer is responsive to the act of determining a consensus of the collected opinion information. According to another embodiment, the plurality of users include information providers that are identified experts in a subject field to which the opinion information relates. According to another embodiment, the method further comprises an act of maintaining a profile of at least one of the plurality of users.

According to one embodiment of the invention, the method further comprises an act of sending the event defined by at least one user to at least one user based on the maintained profile. According to another embodiment, the method further comprises an act of targeting the at least one user to receive the event, wherein the act of targeting is performed responsive to a parameter associated with the maintained profile. According to another embodiment, the parameter measures an ability of the at least one user to predict event outcomes. According to another embodiment, the parameter measures an ability of the at least one user to recognize trends in opinions. According to another embodiment, the parameter measures an ability of the at least one user to influence opinions of other users. According to another embodiment, the method further comprises an act of permitting at least one of the plurality of users to change their opinion.

According to another aspect of the present invention, a method is provided for conducting an online information brokering service. The method comprises acts of permitting a creation of a ticket by at least one user, the ticket comprising at least one observation generated by a user, classifying the ticket by associating one or more tags to the ticket, and locating the ticket based upon the one or more tags. According to one embodiment of the invention, the method further comprises an act of determining, by a computer system, one or more suggested tags for classifying the ticket, and displaying to the user as the ticket is being created the one or more suggested tags. According to another embodiment, the method further comprises determining, based on a description associated with the ticket, the one or more suggested tags.

According to another embodiment, the method further comprises an act of displaying to the user in real-time, the one or more suggested tags as the description associated with the ticket is created by the user. According to another embodiment, the method further comprises an act of permitting the user to associate the one or more tags with the ticket. According to another embodiment, the method further comprises an act of permitting the user to accept at least one of the one or more suggested tags. According to another embodiment, the method further comprises an act of searching one or more databases to determine whether a similar ticket exists, the act of searching being based at least in part on the one or more tags.

According to one embodiment of the present invention, the method further comprises an act of determining, based on the search, whether the ticket is unique among a plurality of previously-created tickets. According to another embodiment, the method further comprises an act of determining one or more related tags associated with the one or more tags, and presenting the one or more related tags to the user. According to another embodiment, the method further comprises acts of presenting, by a computer system, the ticket to a plurality of users, accepting, from each of the plurality of users, a respective opinion regarding the ticket, and determining a consensus of opinion among a plurality of users regarding the at least one observation of the ticket. According to another embodiment, the computer system accepts a plurality of user opinions relating to the created ticket.

According to another embodiment, the method further comprises an act of presenting one or more similar tickets to the user. According to another embodiment, the method further comprises an act of presenting one or more users that authored the one or more similar tickets to the user. According to another embodiment, the method further comprises an act of displaying, to the user, an indication of the number of tickets associated with a particular tag. According to another embodiment, the method further comprises an act of permitting the user to locate similar tickets relating to the displayed number of tickets.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to one aspect of the present invention, it is appreciated that it may be useful to convey information from early observers to information consumers so that decisions can be made at an early stage. One aspect of the present invention relates to an early detection and survey method to track and predict trends in various markets which can be used to monetize the early trends.

Figure 1:
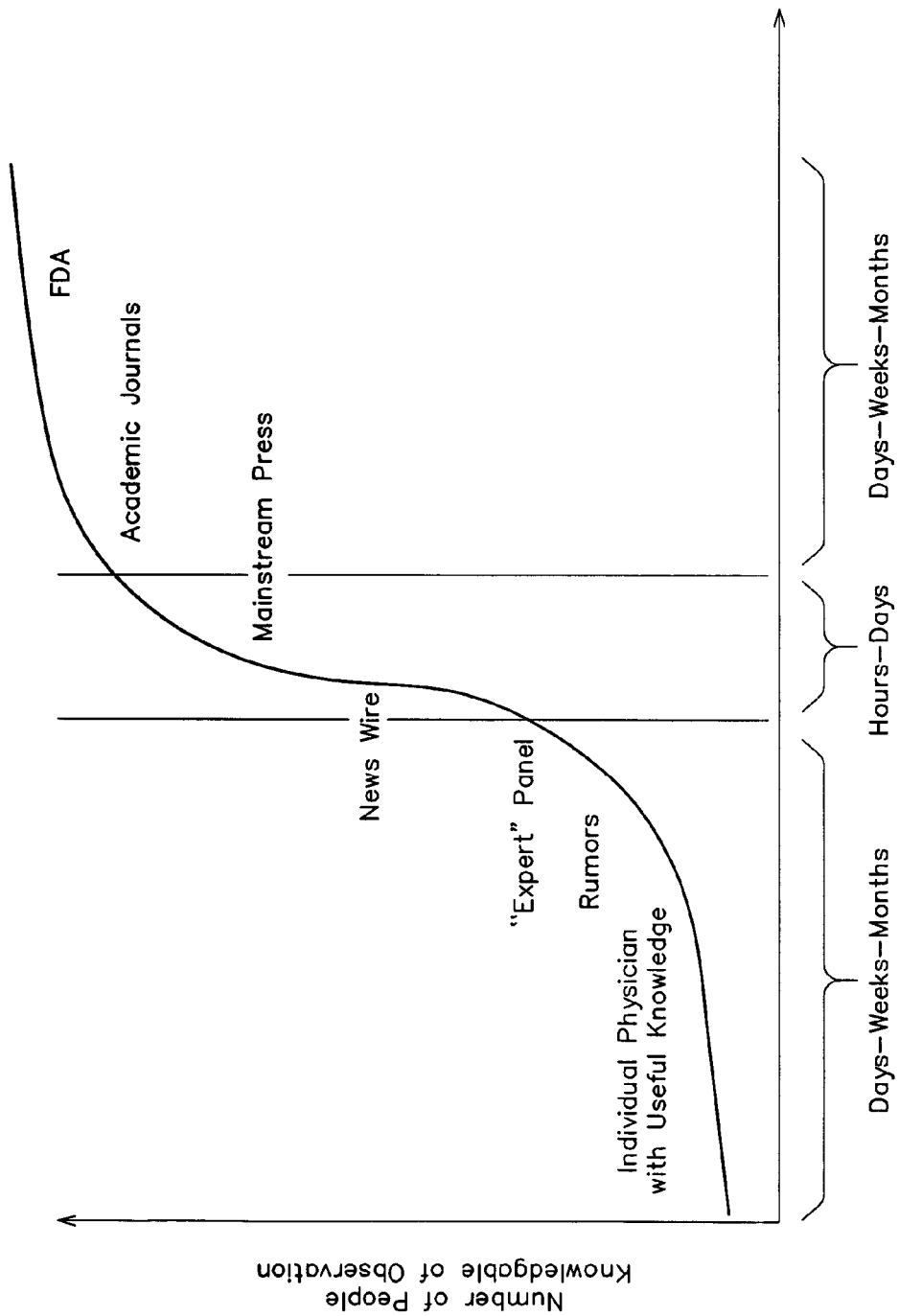
FIG. 1 is a chart showing a number of knowledgeable people as a function of time accordance with aspects of the present invention.

As shown in FIG. 1, it is appreciated that it takes time for information to be disseminated from people that have early observations (e.g., a physician that makes a useful observation in the field) to other people and entities that act on such information (e.g., an information consumer such as the FDA). For instance, a period of days, weeks, or even months may elapse before a useful observation becomes public knowledge (e.g., through a newswire service) and becomes public information. There may be additional periods of time that elapse before the observation makes its way to others interested in such information (e.g., to form opinions or to perform an action based on such information). According to one aspect, it is appreciated that an early observation, if corroborated, may be effectively used as information to perform an action. One example includes detection and reporting of adverse effects of drugs. An information consumer such as the FDA, an investor, or other entity may perform an action (e.g., open an inquiry, perform a trade) in response to receiving the adverse information generated by an early observer in the field. If received early, such information may be used to save lives, time, and money.

To this end, it is appreciated that a system and method for identifying early observations and communicating them amongst interested parties in a more timely manner would be beneficial. In one embodiment, one or more computer systems (e.g., Personal Computers (PCs), Portable Digital Assistants (PDAs), telephones, or other computer system types) using various forms of communication (e.g., Internet, cellular network, etc.) may be used to create an online ecosystem described below used to exchange observation information between information providers and consumers, and to corroborate such observations.

Online Ecosystem

In one embodiment, an online "ecosystem" is created, the ecosystem including a community of users that together, function to exchange information. Such an ecosystem may be novel in its integration of prediction markets, social networking, decision making, and group consensus. In such an ecosystem, a community is created by one or more rules influencing the behavior of a plurality of users. According to one embodiment, the rules adhere to the basic drives and ambitions of the users and channel the interested users back into the ecosystem community. In particular, rules may be designed that provide incentives (and disincentives) for certain types of behavior. Optimally, the rules encourage users to submit original ideas and encourage others to review these ideas to foster consensus. In one embodiment, the rules function without external (other than users) or moderator intervention.

The overall ecosystem may be driven by several processes. One process permits users to take independent actions, and the user's independent actions affect the ecosystem. Therefore, the ecosystem can be self-perpetuating. Further, the ecosystem can create its own content, as users define and vote on the observations and opinions of others. The ecosystem may be self-regulating, for instance, as users determine the value of the collected observations and opinions. One method of the driving of the ecosystem involves recruiting new users as individuals within the ecosystem pursue their own interests.

The ecosystem can be manipulated to fit the interests of those that run the ecosystem (e.g., a system operator) is by generating valuable data for third parties that consume information generated by the ecosystem. One method for ensuring that valuable data is generated includes creating rules that promote the creation of valuable data, and by integrating adjustable variables into the rules.

Such an ecosystem may be applied to different problems, markets, and subject areas. One such application is healthcare, and the medicine in general. The healthcare industry is a good application of such a system, as there are a number of readily available customers for the information generated by the ecosystem. For instance, there is a need to capture original observations to further the advancement of understanding of medical treatment, drugs, and related research, and to ensure patient safety. Such observations may also be valuable to the financial community when making investment decisions, and thus a system that makes such observations aware to the community would be beneficial. Another application includes the observation of the spread of disease, and monitoring for outbreaks of such diseases. Further, the ecosystem may permit physicians to further the advancement ideas by allowing them to submit observations and to comment on observations of their physician colleagues.

The ecosystem may align the interests of clinicians, industry, and researchers to more effectively capture physician observations and insight, potentially improving surveillance and allowing more rapid insight into physician consensus on a given topic. Organizations that benefit from early insight into healthcare information create a financial incentive used to generate, sustain, and regulate participation in the online community or ecosystem.

One version of the ecosystem can leverage a high value of healthcare-related subject-specific information that can be shared among interested users. Further, the ecosystem can successfully exploit multiple behaviors of various users, such as greed, drive for collaboration, and humanitarianism. Because there is a continuous need for information, the information of the ecosystem is self-renewing and replenishes itself continuously. Although healthcare is one application of such an ecosystem, it should be appreciated that the invention is not limited to any specific field, and may be applied to other information-sharing situations where collaboration facilitates information that has value.

In one example application of such a system, a value of a physician's observation (modeled in the system in the form of a "ticket") in the system is determined by how many people agree or disagree with the observation at any given moment. Physicians from diverse backgrounds are incentivized to submit observations and to corroborate or dispute those observations to the system, providing a resultant method by which clinical data may be gathered. Further, a ranking of users may be determined, used to determine a value of observations, and to incentivize desired ticket creation and/or voting behavior.

Example Ecosystem

In one example implementation, a system is provided that permits a user to perform a number of actions relating to observations or opinions submitted by users. In one particular embodiment, the user may submit observations or vote on existing observations. In one example implementation, the observation may be represented in the system in the form of a "ticket." In the example, the ticket is a construct that permits an idea to be shared and viewed by other users as well as allowing the system to track the idea as it progresses through the ecosystem.

A user may create an observation by creating a ticket that describes the observation. In one example, the ticket includes a number of parameters including a description of the observation as entered by a user (e.g., in the form of text and/or phrases describing the observation). In one example, the length of description of the observation associated with the ticket may be any length (e.g., no minimum or maximum length). In other words, the observation description can be as long as a user wants, or as short as he/she wants.

Also, the user may be permitted to express an opinion on an existing observation by voting on an existing ticket. In another embodiment, the user may be permitted to submit an answer or opinion to the observation. The answer may be in the form of a yes/no response, or the user may be permitted to submit an alternative answer. Here, the user is permitted to provide an additional statement that allows the user to qualify their response.

In another example, the user is permitted to provide an additional statement which allows the user to provide an alternative response that may be viewed and selected by other users. Each of these possible responses may be viewed by other users in the ecosystem (e.g., as a multiple choice selection), from which they may choose to provide (or may not) a different response.

The user may also be "charged" a currency for voting on a ticket. For instance, the user may be provided a particular number of points or other credit, and decremented each time the user votes on a ticket. The user's credit may be increased in response to a positive behavior exhibited by the user in the ecosystem (e.g., the user creates tickets, provides early votes, becomes an expert in a particular field, etc.). In this manner, the system rewards positive behavior and encourages participation in the ecosystem.

In one embodiment, when a user writes a ticket, the user classifies the ticket. The classifications may include but are not limited to classifying the ticket as a particular type of observation. There may be more or less classification types, depending on the application, but are generally referred to herein as an observation. The tickets may also be classified by the user and/or system. For instance, tags or other classification information may be associated with a ticket.

According to another embodiment, the ticket may also include classification information, either part of or separate from the ticket, the classification information indicating an organization of the ticket such that the ticket may be easily located. In one embodiment, it is appreciated that metadata in the form of "tags" or keywords may be associated with information such as tickets, and tags may be used to classify tickets. Because tickets have associated tags, tickets with similar or the same tags may be located more easily by a system or an associated user. Further, actions may be performed in response to tag information, such as alerting a user when a ticket having a particular tag is created, locating similar tickets using tag information, and other actions relating to the organization and control of tickets.

According to another embodiment, the system may present to the user an interface that provide real-time feedback of classification information as the user enters information associated with the ticket. For instance, a list of related tags may be presented to the user, and while the user enters description information of the ticket, the list of the most relevant tags may be changed in response to the entry of the user. In this way, the feedback permits users to create better tickets (by seeing how the system would classify the ticket) and also permits the user to easily locate similar tickets (e.g., by selecting tag information presented in real-time to the user in the interface).

According to one embodiment, an observation may be classified as a "Case" observation. Using such an observation, it may be useful to permit users to submit observations by users in a position to view a particular event or condition. Generally, any user regardless of rank or stature may be suitable for making such an observation.

In another example, an observation may be classified as a "Consult" observation. In such an observation, it may be useful for a user to submit an observation, upon which other users can provide their opinions or consultation on the observation. Generally, observations made by users having a higher rank, voting history, or other status may be valued by the system more than observations made by lower-ranked users. There may be other observation types and combination types thereof by which a particular observation may be classified.

In one embodiment, the online system may assign each ticket a "value." Depending on the subject matter of the observation, the ticket may be assigned an initial value, which may be adjusted depending on the market value of the ticket (e.g., the value of the ticket as determined by a bid process involving interested information consumers) and/or the opinions (e.g., in the form of votes) set forth by other users relating to the ticket.

The values may be assigned in real-time, when the ticket is created, however, the initial value can be revisited with the value on any given ticket increased or decreased as needed to promote the health of the ecosystem. Health of the ecosystem may be monitored, for example, by measuring a number of votes received in a particular area, ticket, or issue. Once submitted, any other users can vote on a ticket or submit an alternative answer with a ticket as well as forward the ticket to any other users inside or outside the ecosystem.

The ecosystem may have a number of different types of consumers and providers of information. Users that provide observations may or may not be charged a fee for accessing the ecosystem, but in one embodiment of the ecosystem, information consumers are charged for their use and access to the observations and opinions provided by and ability of the system to establish communication between others. In one example system, consumers may be charged a subscription fee to observe overall activity within the ecosystem. Such fees may be used, for example, to maintain the ecosystem. Further, other fees may be charged to consumers for cultivating tickets submitted by others. In such a system, for example, customers may observe a ticket that the consumer wishes to draw attention to, or cultivate. Once the consumer becomes the owner of the ticket (e.g., through a bid process or other process), the results of the ticket may be the exclusive property of that consumer. In another example system, the results may not be shown to the public. In yet another example, the results of the ticket may be the exclusive property of the consumer for a fixed period of time (e.g., 60 days) after which, the results are published to the ecosystem.

In such an ecosystem, it is appreciated that there may be trade-off between consensus and early warning, but according to one embodiment, such a model according to various embodiments may perform more quickly and accurately than conventional survey models. In one such system, a customer/information consumer may be permitted to set predefined "triggers" that alert the consumer if/when a user (e.g., a physician) makes an observation of interest. The consumer may then be able to identify to the ecosystem how many users would need to vote on that observation for the observation results to be valuable to them. The system may determine the current voting rates for the desired population of users, the amount of incentives (e.g., money) that needs to be applied, and when the consumer agrees, that consumer may be granted exclusive access to the result information. Optionally, users that vote on the observation may be made available to the consumer for direct contact, permitting the consumer to more quickly and effectively reach a targeted group that has the necessary insight and/or experience in a given area.

Example Process

Figure 2:
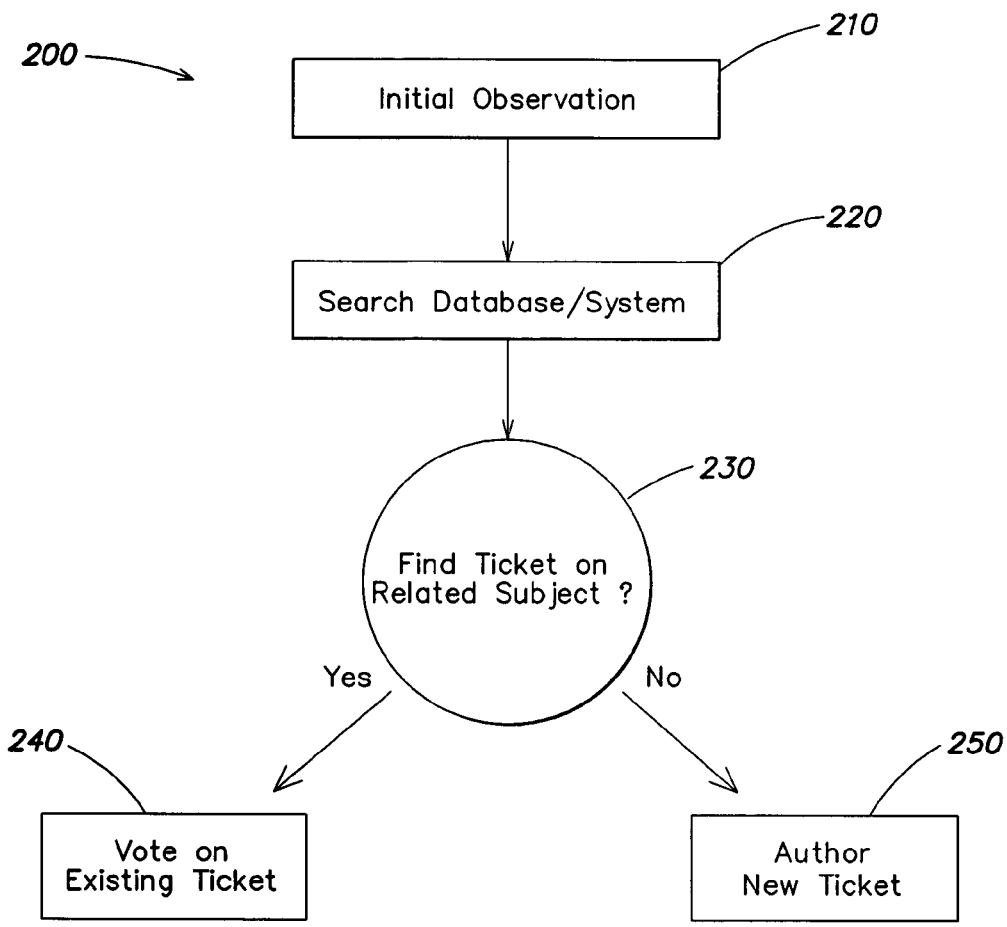
FIG. 2 is a flow chart showing a process for interacting with an online system according to one embodiment of the present invention.

FIG. 2 is a flowchart showing an example process 200 for interacting with an ecosystem according to one embodiment of the present invention. In one example, the ecosystem may include one or more computers and/or communication systems used to communicate information between users. A user may have an initial observation, insight or idea (e.g., at block 210). At block 220, the user logs onto the system and uses an interface of the system (e.g., a web-based search engine or similar interface) to search and verify whether the observation, insight or idea does not already exist. In one embodiment, the user may be required to join the ecosystem (e.g., have a uniquely-identifiable identity such as a username/password) in order to create tickets and/or vote.

The user may be permitted to create a ticket according to the initial observation, and submit the ticket to the system. The system (and/or the user) may search existing tickets to determine whether there is a ticket on a related subject of the idea, observation or insight at block 230. For instance, a keyword and/or tag search may be used to verify if a ticket already exists on the user's insight, observation, question, idea or thought. Such a search may be performed manually by the user, but additional searching may be performed by the ecosystem itself (e.g., by searching tag data stored in association with other tickets previously created in the ecosystem).

If a similar ticket is found, then the user may be permitted to vote on the existing ticket (e.g., by agreeing or disagreeing) with the existing ticket at block 240, or by proposing an alternative response. The user may optionally be permitted to perform other actions with respect to the ticket, such as, for example, commenting on the observation by authoring a statement in a blog, comment area, or other location, sending the ticket to other users, etc.

If no similar ticket was found and/or identified, then the user may be presented the opportunity to create a new ticket at block 250. Thus, if the user and/or system did not identify any similar (or adequate) tickets, they could submit their own. A process of authoring a ticket may involve the user submitting one or more pieces of information, including, but not limited to, a title for the ticket, a description of the observation, and any proposed classification(s) of the ticket (e.g., through the use of tags), embedding images associated with the observation (e.g., medical test results, pictures, etc.).

In one embodiment, the ecosystem may provide incentive to the users to make the ticket specific enough so that others with the same observation would identify with it, but not so general that the ticket would generate inconclusive insights. Once submitted, a ticket may be made available for all users to vote on. The ticket author and those users that subsequently vote on the ticket now have a vested interest in promoting that consensus.

Once a ticket is submitted or a vote made, users may be presented real-time feedback regarding the status of the ticket, and any status regarding any payments to be made for submitting and/or voting on tickets. In one implementation, users may be compensated based their ability to predict consensus. In one example, the payout that a user receives may be determined as a function of how many people vote in agreement after them, modified by the weight of the ticket, the user's reputation, and a variable that describes the quality of the consensus.

Figure 3:
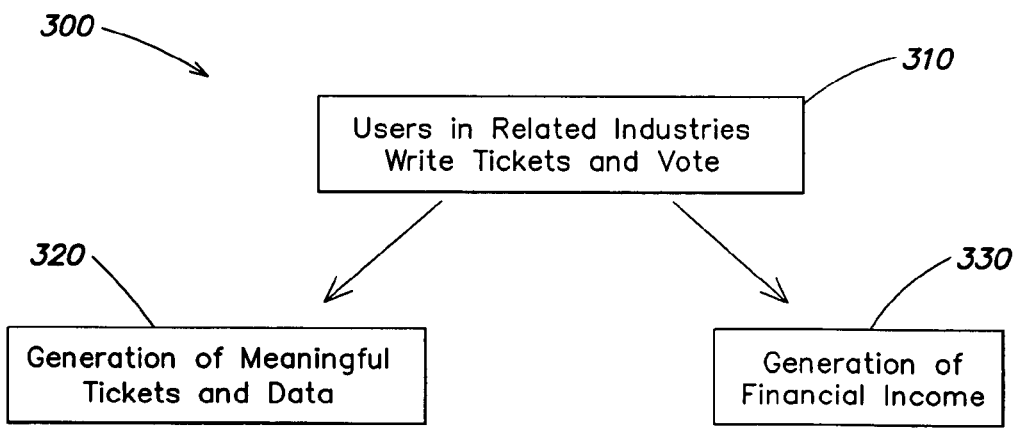
FIG. 3 is a flow chart showing a process for interacting with an online system according to another embodiment of the present invention.

FIG. 3 is a flowchart showing an example process 300 for interacting with an ecosystem according to one embodiment of the present invention. Once a ticket has been posted on the online ecosystem, the ticket can be viewed and voted upon by users, can be forwarded by a user to their colleagues, friends, peers, etc. via many sources of communication to encourage them to vote on the posted ticket at block 310. For example, tickets may be sent to other users via electronic mail, wireless paging, telephone, or any other method of communication.

As a product of maintaining the ecosystem, meaningful observations are generated, along with financial income for the ecosystem participants. In one embodiment, users are encouraged and rewarded for their votes and original ideas at block 320. For instance, the amount that a user may be rewarded may be influenced by the accuracy and speed in which they vote and predict outcomes. In addition, the system has the ability to recognize the trends as opinions and votes are posted by users, and provide such information and trends to information consumers. Similarly, at block 330, the system may generate financial income for the participants as providers and consumers in the ecosystem.

Figure 4:
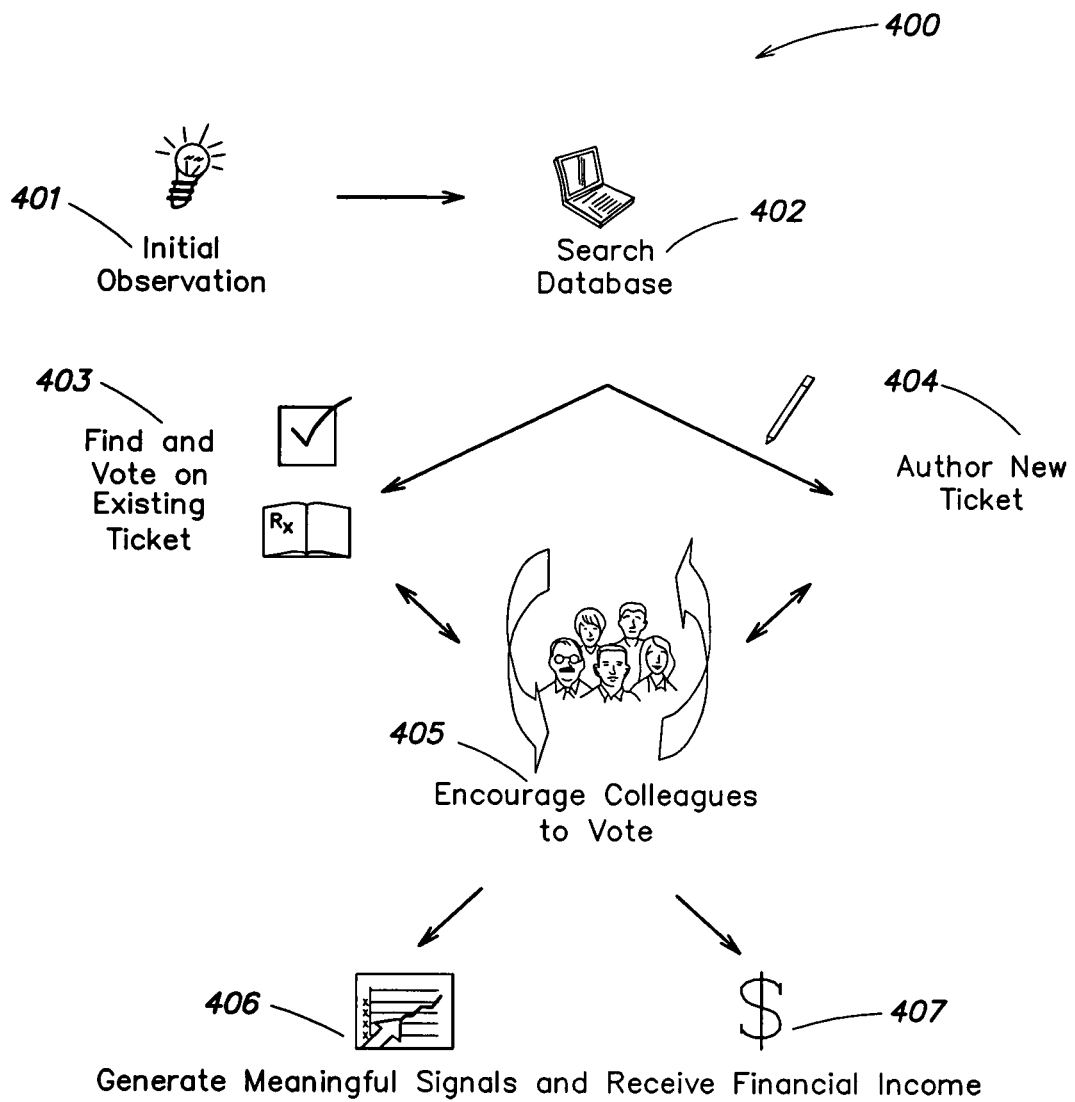
FIG. 4 is an example use case showing a process for conducting an online system according to one embodiment of the present invention.

FIG. 4 is an example use case showing an example process 400 for conducting an online system according to one embodiment of the present invention. A user (e.g., a physician) makes an initial observation (block 401). The user accesses the ecosystem and searches a ticket database (block 402) to determine if there is a related ticket (and observation) generated from another user.

If a ticket already exists, the user may find and vote on an existing ticket (block 403). If not, the user is permitted to author a new ticket (block 404) and submit the same to the ecosystem. Additionally, the user may encourage others to review and vote on the ticket (block 405), especially those users that have previously voted on similar tickets, are experts in a related field, or those identified with ability to accurately predict events.

The ecosystem, after receiving user votes on the created ticket, may generate signals regarding the observation (block 406) that indicates the quality of the observation to others (e.g., information consumers). Also as discussed, users creating the ticket may receive financial rewards (e.g., compensation or income) depending on the quality of the observation and need of the observation in the marketplace.

Figure 5:
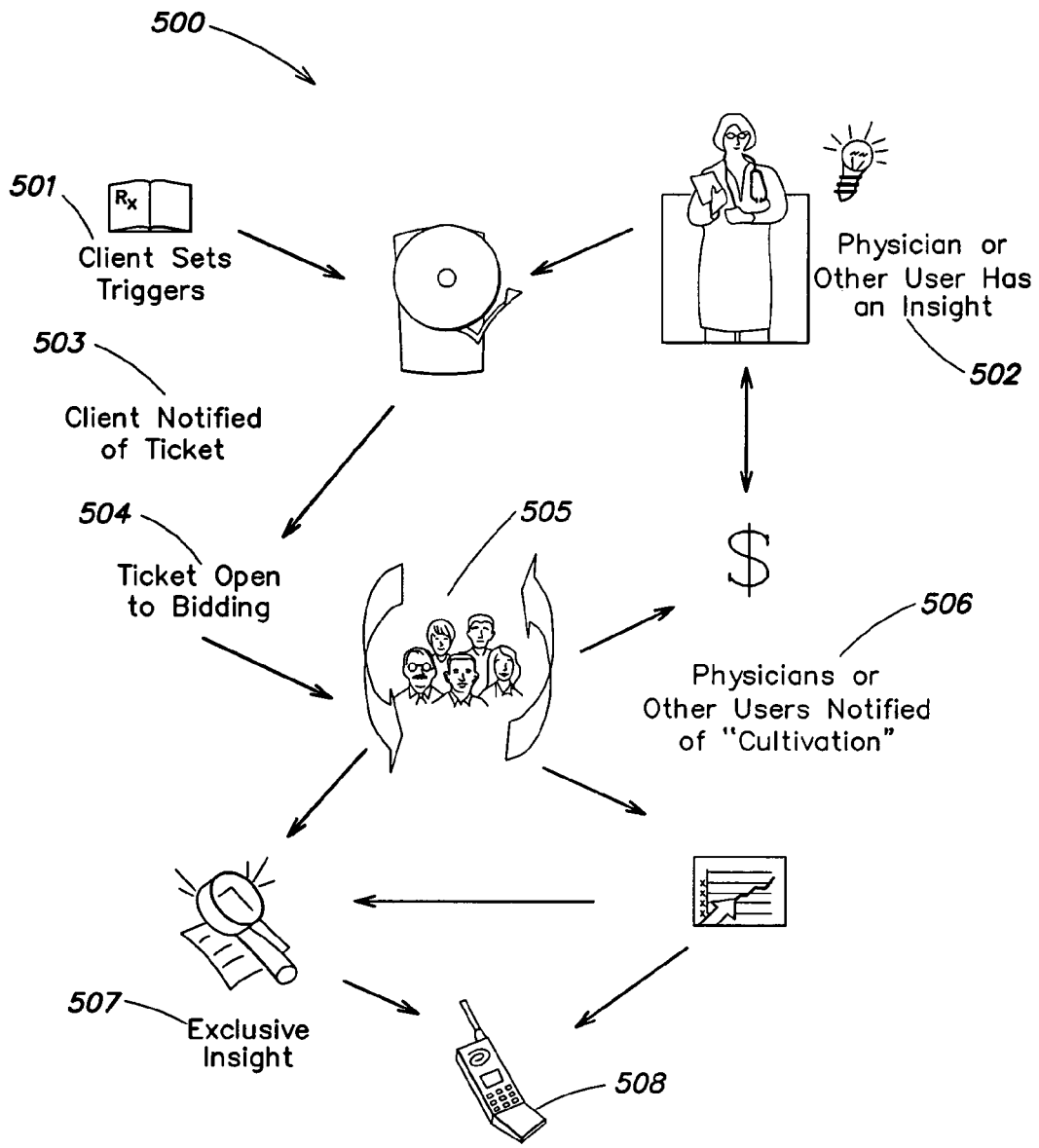
FIG. 5 is an example use case showing a process for conducting an online system according to another embodiment of the present invention.

FIG. 5 is an example use case showing an example process 500 for conducting an online system according to another embodiment of the present invention. In the example, a client or other information consumer interested in particular observation information may be capable of setting (e.g., within an interface of a computer system) a trigger that, when activated, causes the client to be notified when a ticket having a particular parameter value is submitted (block 501). For instance, an equity trader may want to set a monitor for a particular drug name of interest, a particular company name, or other parameter. At block 502, a physician or other user has an insight and submits a ticket to the ecosystem. In the example shown, the ticket may include some parameter (e.g., a keyword) that activates the trigger, and the client is notified (e.g., at block 503). In one example, keywords of the ticket are used to create tags associated with the ticket, and triggers defined on these tags are activated when a ticket is created or otherwise classified using such tags.

At block 504, the ticket is opened for bidding to one or more information consumers, who will bid to determine exclusive access to the result of the voting process. After a winning bidder is determined, the ticket is submitted to the ecosystem where other users vote on the ticket (block 505). In parallel, physicians or other users may be notified that the ticket has been cultivated (block 506), where compensation is determined. When the ticket is cultivated and compensation (e.g., a price) is determined for the winner's access to the ticket, access to the result information is provided to the winning bidder (block 507).

After the ticket is cultivated, users may be permitted to vote on the ticket as described above. Also, the client determined to be the winning bidder may be notified of any result or consensus determination associated with the ticket, or any updates that may occur after consensus is reached (block 508).

Figure 6:
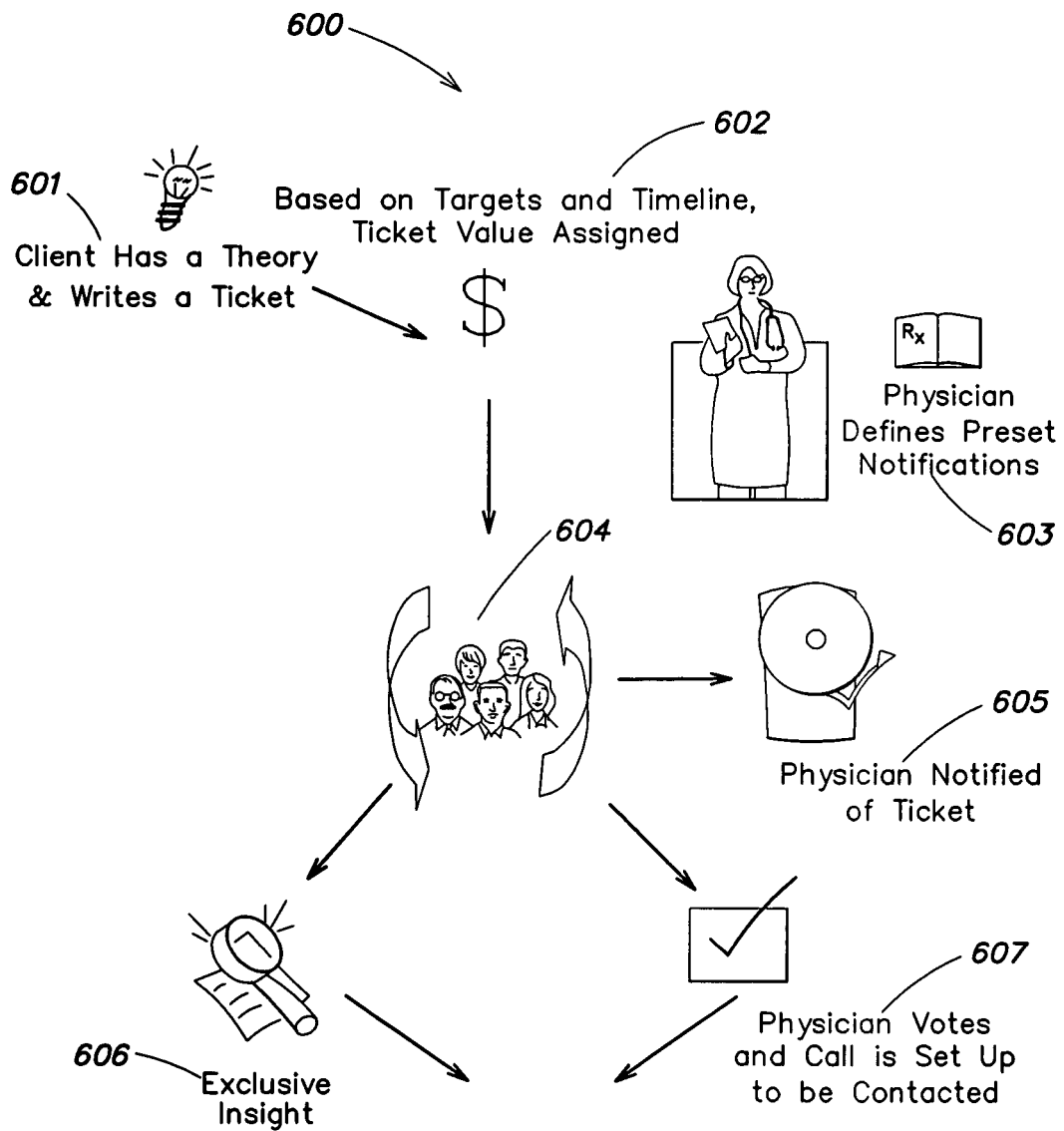
FIG. 6 is an example use case showing a process for conducting an online system according to another embodiment of the present invention.

FIG. 6 is an example use case showing an example process 600 for conducting an online system according to another embodiment of the present invention. According to one embodiment, an information consumer may be capable of initiating collaboration in an area of interest. For instance, an information consumer (or client) may have a theory or other idea for which they need feedback from the user community or otherwise needs feedback from a population of users. In one embodiment, the information consumer can target a particular user population (e.g., a group of experts in a particular field) in order to receive their feedback on a particular topic. This may be particularly helpful as a tool for a client to reach consensus on an issue in a timely manner from a group of experts or authorities in a particular area.

To this end, the client submits a ticket to the ecosystem (block 601). Because the idea is proposed by the information client, the specific client may propose particular target goals, a timeline for developing consensus on the issue, and may assign a dollar value to the ticket (block 602). The ticket is then submitted to the ecosystem (block 604) where the ticket can be reviewed and voted on by users. In this way, the client may determine the parameters that define how the information should be delivered, how much the information is worth, etc.

In the case of an ecosystem that relates to medical issues, a physician or other type of user permitted to participate in the ecosystem may view and vote on the ticket. In one embodiment, a physician may set a trigger that indicates when particular types of tickets are submitted to the ecosystem. For instance, if a ticket relating to cardiac pacemakers is submitted, a particular physician may be notified by the ecosystem. A user may set a notification, for example, based on any type of information associated with the ticket, including keywords, classification of the ticket (e.g., a tag value), or any other information (block 603). Thus, based on a predefined notification, a physician or other user may receive an indication of a ticket being submitted to the ecosystem (block 605), increasing the probability that relevant users will vote on the ticket, and therefore, consensus will be reached earlier.

Because the client submitted and financed the ticket, that client may gain exclusive insight into the result of the consensus determination by the ecosystem, and any related opinion data (block 606). Also, the client may require further follow-up after consensus is reached, and may have additional options in this regard. For example, for a physician that votes on the ticket, a call may be set up to discuss related issues (block 607), continue research on the topic, or perform any other type of effort.

As discussed, the ecosystem may be used to couple any type of information providers and consumers for the purpose of exchanging observations and information. For instance, professionals such as lawyers, consultants, investors, engineers, scientists, etc. may be capable of submitting observations to a group of information consumers. Information consumers may include any entity that is interested in the information, and more importantly, is willing to pay for the information. For instance, information consumers may include companies, firms, government entities, and individuals.

One embodiment of an ecosystem may be directed to the investment community which can offer significant rewards for information that is relevant to investment. Increasingly, funds trade upon near-instantaneous information about medical products that may affect company stock prices. An ecosystem that connects financial information consumers to physicians and other field observers can provide a mechanism to identify relevant issues long before they are identified and released by traditional thought leaders (e.g., the FDA).

Pharmaceutical and medical device companies may also be important revenue sources. In the medical field, current reporting standards depend upon physician calls to report adverse events, and sometimes, without significant incentive on the part of companies to forward the reports. Companies may use the ecosystem to monitor events associated with their products so that they can gauge the adoption of new devices, detect adverse events, and solicit input from the online community.

Revenue sources can be divided into a plurality of categories, two of which include surveillance and survey. Surveillance watches for trends that appear in new tickets and opinions. Although surveillance is, by definition, passive, the ecosystem can be manipulated by adjusting the ticket value that is assigned to new and existing tickets. For example, the greater commercial value of tickets relating to particular subject matter may be adjusted so that these ticket types are valued over tickets relating to other types of matters. For instance, although it is likely that device and pharmaceutical tickets will likely have greater commercial value, clinical insights with implications for public health can be weighted to attract more opinions. Thus, the behavior of users within the ecosystem may be adjusted using incentives.

Potential surveillance trends that may be monitored may include, for example, the total number of opinions, the rate at which the number of opinions increase, and the ratio of opinions (Yes vs. No, Agree vs. Disagree or some other opinion/observation), the composition of opinion makers (average rank/reputation of user), among others. Surveillance may be based on a subscription model and can be segmented (for sale to different markets) on the basis of a pattern, subject matter (including, for example, keyword search and subject headings), and pattern recognition, tag information, etc.

In one embodiment, a ticket may be created that consults a group of users. In particular, the ticket may be based upon intentionally introducing and/or promoting tickets to targeted groups of users. For instance, a customer who is looking to gather information on any given topic can construct their own ticket (e.g., discussed above with respect to FIG. 6). Assigning of ticket value and promotion mechanism to gather this information may be conducted in real-time. Furthermore, the survey can be targeted at specific user types. Responses can be categorized by user profile, and weighted based on past performance.

Further, users may be "profiled" so that the ecosystem and its users may be distinguished from one another for the purpose of evaluating their opinions. This "profiling" allows for intermediation by the ecosystem between the users and various clients. In one embodiment, the ecosystem may be adapted to recognize and identify which users are the innovators, the thought leaders, and/or the best predictors generally or in particular areas of expertise. This information is certainly of tremendous value to advertisers, manufacturers, etc., as this identification may be exploited (e.g., by advancing a particular ticket to a subset of users that are the best predictors to reach consensus earlier).

In one embodiment, the system may include the ability to track users and distinguish among users based on their profile information. For instance, users may be distinguished based on their early recognition of trends, ability (or inability) to post accurate predictions, voting accuracy, and/or ability to influence others.

The ecosystem may also be adapted to offer any sort of combination of industry insight. For instance, the ecosystem may be able to target users by specialty, by predictive ability, ability to post accurate predictions, ability to recognize trends early, ability to influence others, determining who the influencers are, among others.

Profiling also allows for the introduction of another variable into determining income, referred to herein as consensus "quality." The ecosystem may be adapted to identify certain patterns in emerging consensus. For instance, the system may identify users of a similar type. For instance, it is appreciated that a consensus about a ticket relating to a specific medical specialty held by users in that same medical specialty will have greater value. In other words, an opinion held universally by a sub-segment of the user population, which is known to be within that subset's area of expertise, indicates a far more important or "pure" consensus.

Further, by collecting profile information, other types of trends may be observed. For instance, the ecosystem may cross-reference emerging consensus with a geographic and/or institutional distribution of the users. Also, geographic information may be used to recognize collusion outside of the system. Further, by observing voting patterns among users, collusion may be detected. For instance, patterns of voting that use the exact same population of users, or likewise the same sequence of users, can be a signal for off-line collusion.

Ecosystem Rules

The success of the ecosystem depends on the dynamic content created by its users. But the freedom necessary for this creates a problem: How can users be encouraged to act in a manner that is productive to the community without administrative oversight? According to one embodiment, users are provided incentives that match their personalities and interests that will encourage them to share their knowledge with the ecosystem. Further, it is appreciated that users should be discouraged from "gaming" the system to their benefit. For example, if a physician will gain a reward for creating a new ticket, what will prevent them from creating fifty meaningless ones?

Further, if there is a financial reward for submitting a correct vote, it is appreciated that there may be a mechanism that prohibits a user (e.g., a physician) from voting on every issue (i.e., guessing). Similarly, the ecosystem may be modulated to provide the types of information that might be of interest to customers at a particular point in time. According to one aspect of the present invention, the ecosystem employs a set of rules that provide incentives for certain actions and provide disincentives for other actions.

For the ecosystem to remain viable, the system may include a mechanism to achieve certain things, for example:

Maintain a high throughput of fresh tickets.

Maintain sufficient volume of votes so that opinions are rendered and "signals" can be detected.

Create incentive and disincentive that keeps users' interests aligned with the overall goals of the ecosystem, preventing gaming of the system.

According to one embodiment, one method for balancing the interests of the users with that of the ecosystem is a basic set of rules. In one embodiment, these rules should to be sufficiently transparent so that users can understand the rules that are dictating their compensation, but retain a degree of opacity so that the system operator can manipulate them to achieve commercial success. According to one embodiment, four basic laws may be used to govern an online ecosystem:

Rank: It may be beneficial to disincentivize random voting and/or random ticket creation. This rule not only prevents users from blanketing the ecosystem with as many votes as possible (in the hopes that one of those tickets will reflect a large financial reward), but the rule also forces users to write tickets and/or vote on those topics for which they think they might have a unique insight or "edge."

According to one embodiment, a user's rank is calculated dynamically and is applied to a ticket at the time of writing or voting, and remains constant for the income related to that ticket. Therefore, at any given moment, a user's reputation (as represented by a user's rank), is based on how accurately they have predicted the future consensus of the ecosystem on any given ticket. Stated differently, rank is a reflection how often those who rendered an opinion after another user who rendered an opinion, agreed with the voter.

According to one embodiment, rank may be determined using the following equation:

$$\text{Rank} = \frac{[(\text{\# of opinions voted in agreement after you}) - ((\text{\# of opinions voted in disagreement after you})]}{(\text{\# of outstanding tickets or opinions})} \quad \text{Equation I}$$

Income: Income for a ticket should be directly proportional to a user's rank, (i.e., the highest rank will result in the highest income). According to one embodiment, user rank may be combined with other factors to modify income on a ticket, such as, for example, the following factors:

Ticket Weight—The ecosystem may include a mechanism for determining which issues are valuable and which are not. For example, a potentially fatal adverse effect of a major prescription drug should be weighted much more highly than an observation about a minor allergy. In one embodiment, ticket weight may be equated with a value of the ticket (e.g., a dollar value as determined through a bid process).

Consensus Quality—The ecosystem may be configured to reward consensus differently. For instance, in one example, a 50/50 voting pattern presents a different quality of information than 90/10.

Temporal Weight—Earlier voters are taking greater risks, and provide greater insight.

According to one embodiment, ticket income may be determined by the following equation:

$$\text{Income} = \frac{\text{Rank} \times (\text{\# of agreements after you}) \times (\text{ticket weight}) \times (\text{consensus quality})}{[\text{\# of outstanding tickets}]} \quad \text{Equation II}$$

Ticket weight or value may have an associated value that is designated by the system at the time of ticket creation, and reflects the commercial value of the ticket to the client (information consumer). One implementation using weight includes using the weight value as a multiplier that raises or lowers the value that the ticket generates. Alternatively, weight can be defined as a dollar value that is assigned to the ticket, and then is gradually drawn down as each successive voter is paid out.

Consensus quality may be measured, for example, by a variable that the client describes to end users. A temporal weight may be defined within the income equation that rewards early voters and ticket writers, and then exponentially decreases payout to later voters and ticket authors.

Balance: A rule may be used that brings into balance voting and ticket writing. In some applications, user income for writing highly successful tickets may be considerable. As such, it is expected that users will be inclined to write as many tickets as possible. This creates two challenges to the health of the ecosystem. First, the ecosystem's ability to render a consensus on any given ticket is based upon the number of votes that the ticket attracts. An ecosystem where a relatively small number of votes are spread out among a large number of tickets is not a healthy one, as it becomes difficult to determine consensus on any particular ticket due to the spread out. Second, according to one embodiment, users should be incentivized to only write tickets on topics for which they believe that they have an insight.

These opposing forces can be brought into balance by tying the number of tickets that a user can write to the number of votes they have rendered. In one example, one ticket can be written by a user for every five (5) votes rendered by a user. In another example, the number of tickets can be determined by a dynamically adjusted variable, based on the current health of the ecosystem.

According to one embodiment, balance may be ensured using the following equation:

$$\text{\# of tickets that can be written} = \frac{\text{\# of opinions}}{5} \quad \text{Equation III}$$

which ties the number of tickets to be written to the number of votes that can be cast. Alternatively, a "points" system may be used that relates the number of votes that could be cast by a particular user to the number of opinions (or tickets) authored (e.g., by awarding points when a user creates a ticket and decrementing points when a user votes on an opinion, or vice versa). Such a relation may encourage users to both author opinions and vote on the opinions of others.

Self-Policing: Through its users, the ecosystem has the capability to generate large amounts of information. However, this abundance of information creates a problem in information management. The freedom to create new tickets can lead to insightful new observations, but it can also lead to self-evident or clinically irrelevant ones.

Additionally, multiple users can make the same observation, worded differently, causing confusion and decreasing the total votes made on the observation. It would be impossible for the ecosystem itself to manage the dynamic, user-created information. Therefore, the ecosystem has created a mechanism for users to be incentivized to manage the system themselves. Before the generation of any new ticket in the ecosystem, a user may be informed of basic guidelines. These guidelines may include the prohibition of self-evident or duplicate posts, or any posts that might be explained by information existing in the public domain (e.g., journals, textbooks, databases, and other medical references, etc.).

When any user in the ecosystem views a ticket, s/he can "report" it as not conforming to these guidelines. This reporting will require some form of risk to that user in order to prevent frivolous reports. In his report, he will cite the ticket and explain his reasoning. Then, the ecosystem will distribute his report to a random selection of the highest-ranked users (e.g., the top 10 highest-ranked users) that the ecosystem has determined have expertise on the ticket's subject. These users will serve to arbitrate the report validity and will be rewarded for doing so. These users will then vote if they agree with the original author or the individual who cited the self-policing policy.

If the post is found to not meet the ecosystem's basic criteria or to violate the self-policing policy it will be removed from the system, the creating user will be penalized, and the reporting user will be rewarded. If the post is valid, it will remain, and the reporting user will be penalized. Through this system, all users who voted in agreement with a removed ticket will lose the rank points they gained, and those rank points will be awarded to the user that successfully cited the law. In this way, the ecosystem simultaneously disincentivizes users from posting or voting on tickets that might be self-evident or unoriginal, while recruiting a population of users to self-police the system. Indeed, users will become increasingly inclined to examine tickets for violations of the Self-Policing rule as the tickets grow in their number of votes because the potential payout becomes higher and higher.

General Purpose Computer System

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to facilitate an online ecosystem according to various embodiments of the invention. Further, the system may be located on a single computer or may be distributed among a plurality of computers attached by a communications network.

A general-purpose computer system according to one embodiment of the invention is configured to perform any of the described functions, including but not limited to, creating, storing, and receiving votes on tickets by/from users and bidding on tickets by information consumers. It should be appreciated that the system may perform other functions, including paying users, receiving payments from information consumers, providing indications to users and consumers, etc., and the invention is not limited to having any particular function or set of functions.

Figure 7:
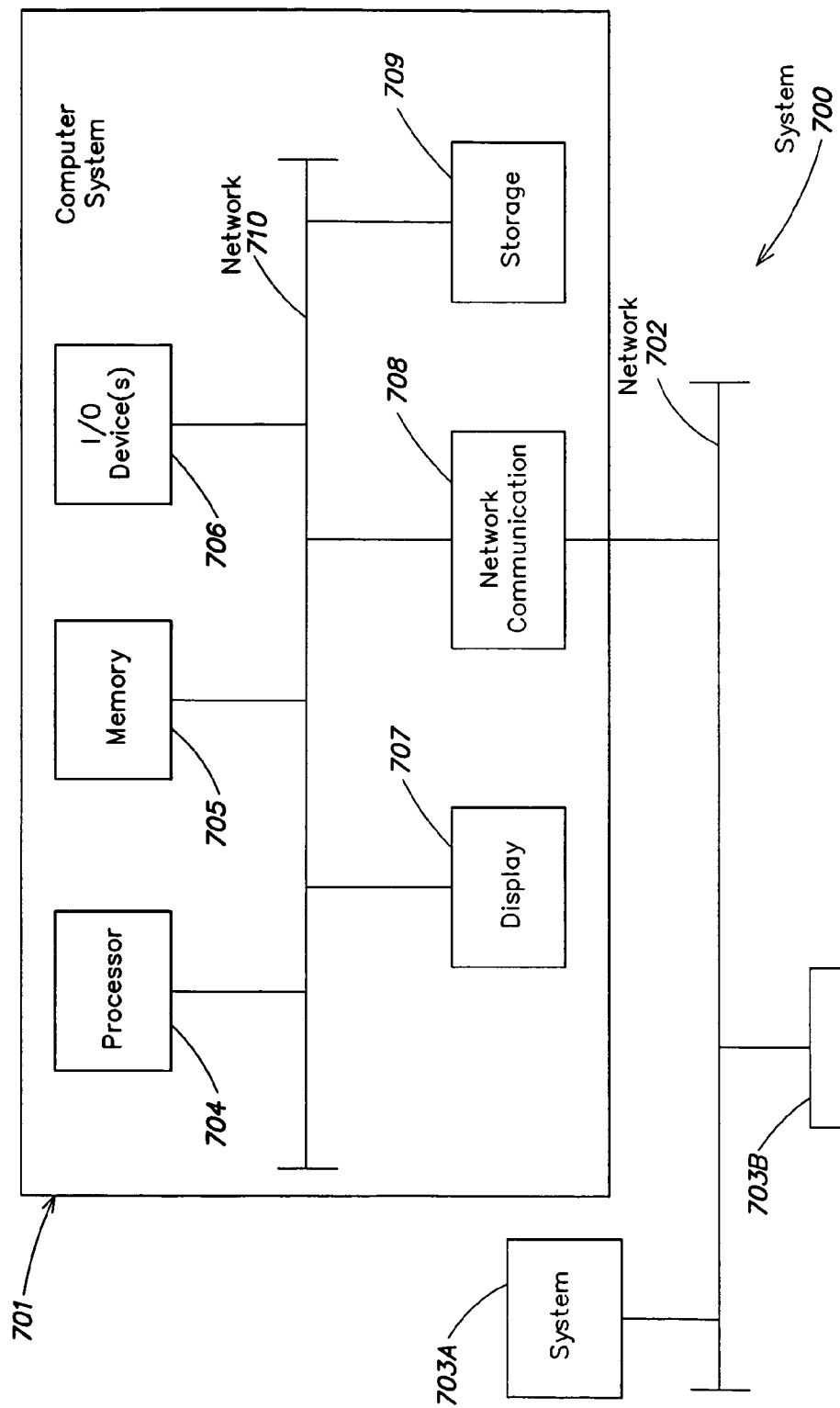
FIG. 7 is a block diagram of a general-purpose computer system upon which various embodiments of the invention may be implemented.

FIG. 7 shows a block diagram of a general purpose computer and network system 700 in which various aspects of the present invention may be practiced. For example, various aspects of the invention may be implemented as specialized software executing in one or more computer systems including general-purpose computer system 701 shown in FIG. 7. Computer system 701 may include a processor 704 connected to one or more memory devices 705, such as a disk drive, memory, or other device for storing data. Memory 705 is typically used for storing programs and data during operation of the computer system 701. Components of computer system 701 may be coupled by an interconnection mechanism such as network 710, which may include one or more busses (e.g., between components that are integrated within a same machine) and/or a network (e.g., between components that reside on separate discrete machines). The interconnection mechanism enables communications (e.g., data, instructions) to be exchanged between system components of system 701.

Computer system 701 also includes one or more input/output (I/O) devices 706, for example, a keyboard, mouse, trackball, microphone, touch screen, a printing device, display screen, speaker, etc. In addition, computer system 701 may contain one or more interfaces (e.g., network communication device 708) that connect computer system 701 to a communication network (in addition or as an alternative to the network 710.

The storage system 709, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 709, as shown, or in memory system 705. The processor 704 generally manipulates the data within the memory 705, and then copies the data to the medium associated with storage 709 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 701 is shown by way of example as one type of computer system upon which various aspects of the invention may be practiced, it should be appreciated that aspects of the invention are not limited to being implemented on the computer system as shown in FIG. 7. Various aspects of the invention may be practiced on one or more computers having a different architectures or components that that shown in FIG. 7.

Computer system 701 may be a general-purpose computer system that is programmable using a high-level computer programming language. Computer system 701 may be also implemented using specially programmed, special purpose hardware. In computer system 701, processor 704 is typically a commercially available processor such as the well-known Pentium class processor available from the Intel Corporation. Many other processors are available. Such a processor usually executes an operating system which may be, for example, the Windows-based operating systems (e.g., Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 700. For instance, the system may be a distributed system (e.g., client server, multi-tier system). In one example, the system includes software processes executing on a system associated with a user (e.g., a client system). These systems may permit the user to create, submit, view, search, and vote on tickets within an online ecosystem.

Example System Architecture

Figure 8:
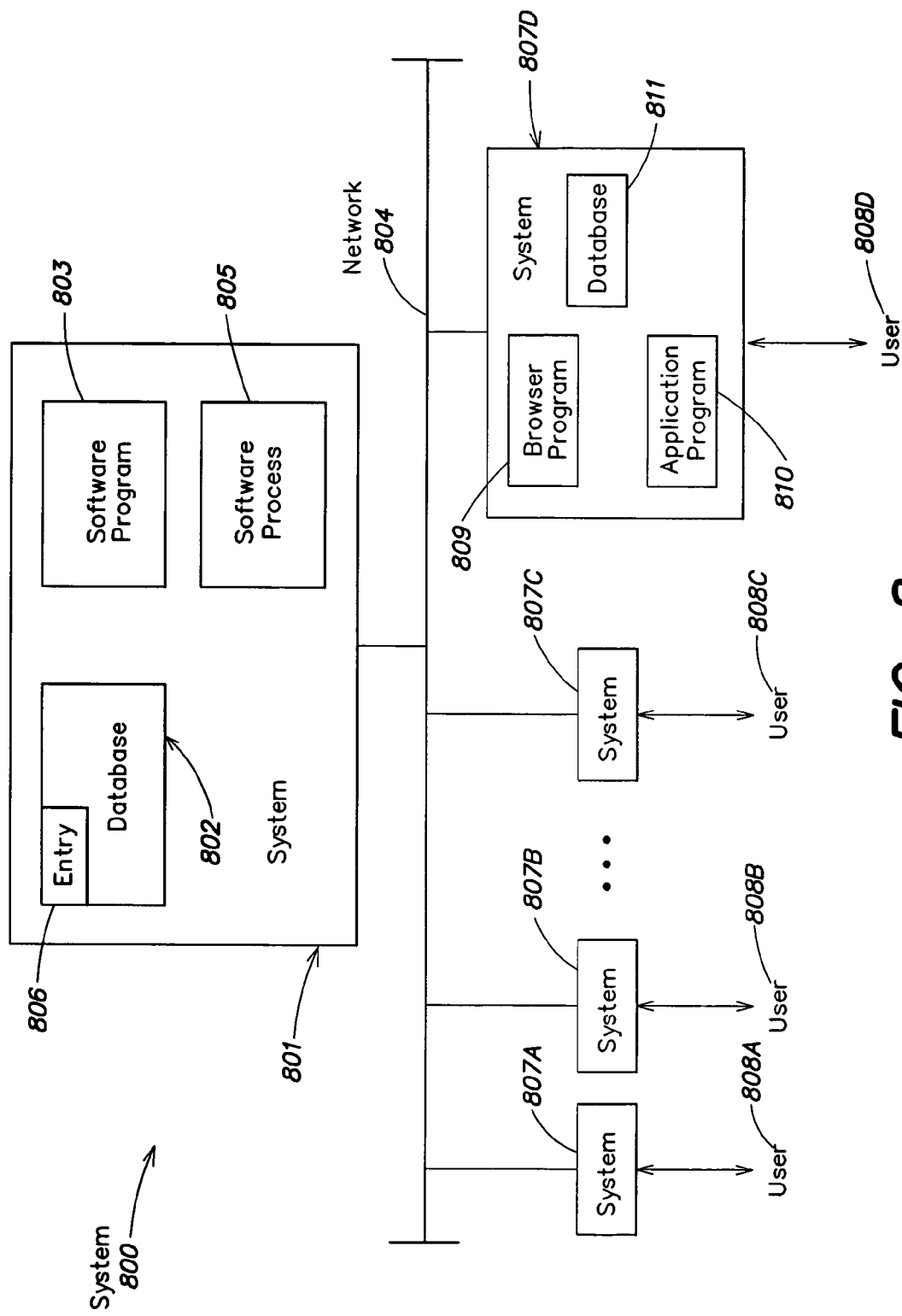
FIG. 8 is a block diagram of a computer system with which various embodiments of the invention may be practiced.

FIG. 8 shows an architecture diagram of an example system according to one embodiment of the invention. It should be appreciated that FIG. 8 is used for illustration purposes only, and that other architectures may be used to facilitate one or more aspects of the present invention.

As shown in FIG. 8, a distributed system 800 may be used to conduct functions of the ecosystem, including, but limited to, the creation of tickets, storing ticket information, determining and storing tag information associated with tickets, performing voting actions, conducting client bidding, and storing user information. System 800 may include one or more computer systems (e.g., systems 801, 808A-D) coupled by a communication network 804. Such computer systems may be, for example, general-purpose computer systems as discussed above with reference to FIG. 7.

In one embodiment of the present invention, system 801 stores observation information in the form of a ticket in one or more databases (e.g., database 802). Further, system 801 performs associated functions with the observation information and its associated ticket.

System 801 may include a server process (e.g., process 805) that responds to requests from one or more client programs. Process 805 may include, for example, an HTTP server or other server-based process (e.g., a database server process, XML server, peer-to-peer process) that interfaces to one or more client programs distributed among one or more client systems (e.g., systems 807A-807D).

According to one embodiment, client programs may be capable of permitting a user to create, submit, view, search, and vote on tickets within an online ecosystem. Such client programs may include, for example, any type of operating system and/or application program capable of communicating with system 801 through network 804. In one particular instance, a client may include a browser program (e.g., browser program 809) that communicates with server process 805 using one or more communication protocols (e.g., HTTP over a TCP/IP-based network, XML requests using HTTP through an Ajax client process, distributed objects, etc.).

Although it is shown by way of example that a browser program may be used to access the ecosystem by users to perform ecosystem functions, it should be appreciated that other program types may be used to interface a user to server process 805. For instance, an application program that is specially-developed to manage ticket data may be provided to permit a user to perform ecosystem functions according to various embodiments of the present invention. The client program may be, for example, a thin client including an interface for managing ticket data. Alternatively, the client may be a scripted program, or any other type of program having the capability of transferring ticket data. According to one embodiment, such client programs may, for example, be downloaded and installed over the network. Further, these client programs may be stored and distributed by system 801 in the form of one or more software programs 803.

In one specific example, the client program may include an application program 810 that permits the user to create, submit, view, search, and vote on tickets within an online ecosystem. This program 810, in one embodiment, may be integrated with browser program 809 executing on system 807D. For instance, the application program 810 may include one or more controls that, when selected by the user, perform functions for manipulating ticket information. These controls may be written in a variety of programming languages, and the invention is not limited to any particular language. In one specific example, the control may be a link that, when selected, performs one or more programmed functions. Such functions may permit the user to create, submit, view, search, and vote on tickets within an online ecosystem.

Information stored in the database 802 may include, for example, ticket information including, but not limited to, a unique ticket identifier, a description of the observation associated with the ticket, user information such as personal information, user names, ranking, voting history, classification information associated with the ticket (e.g., tag information) and other information that can be used to facilitate the online ecosystem.

This information may be collected from the user in an interface (e.g., as presented by program 810) and stored in the database (e.g., database 802). Additionally, client systems may store a local copy of a user's ticket information within a local database associated with the client system (e.g., database 811 located on client system 807D). However, it should be appreciated that the invention is not limited to storing ticket and/or user information in any particular location. A client system (e.g., clients 807A-807D) may include one or more interfaces through which ticket information may be presented to the user. In one example, ticket information and status may be presented in an interface of a browser program (e.g., browser program 809) executing on a client computer system (e.g., system 807D).

Example Implementations

Figure 9B:
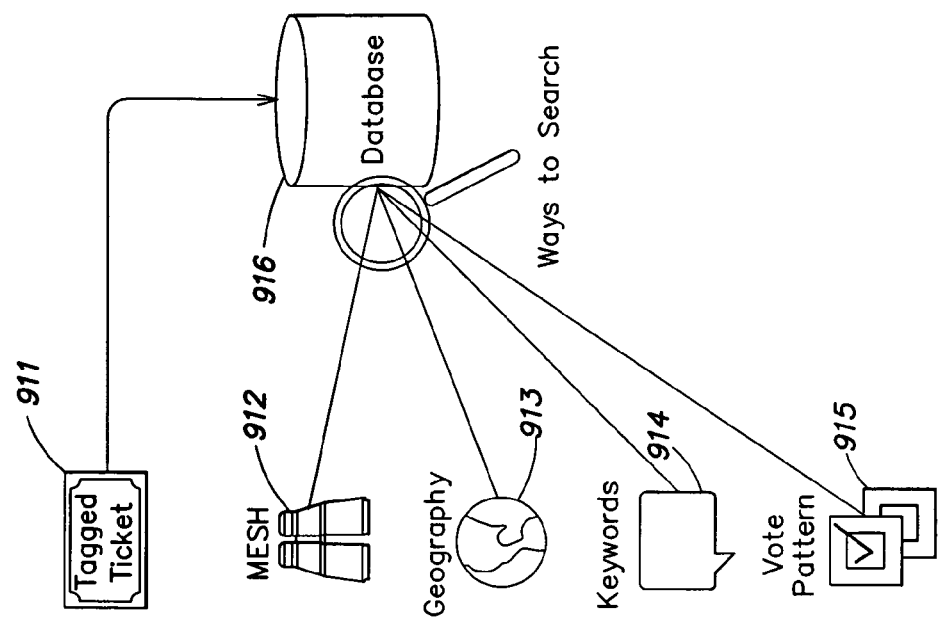
FIG. 9B is a block diagram showing example database elements according to one embodiment of the present invention that may be used in a ticket access and triggering process.
Figure 9A:
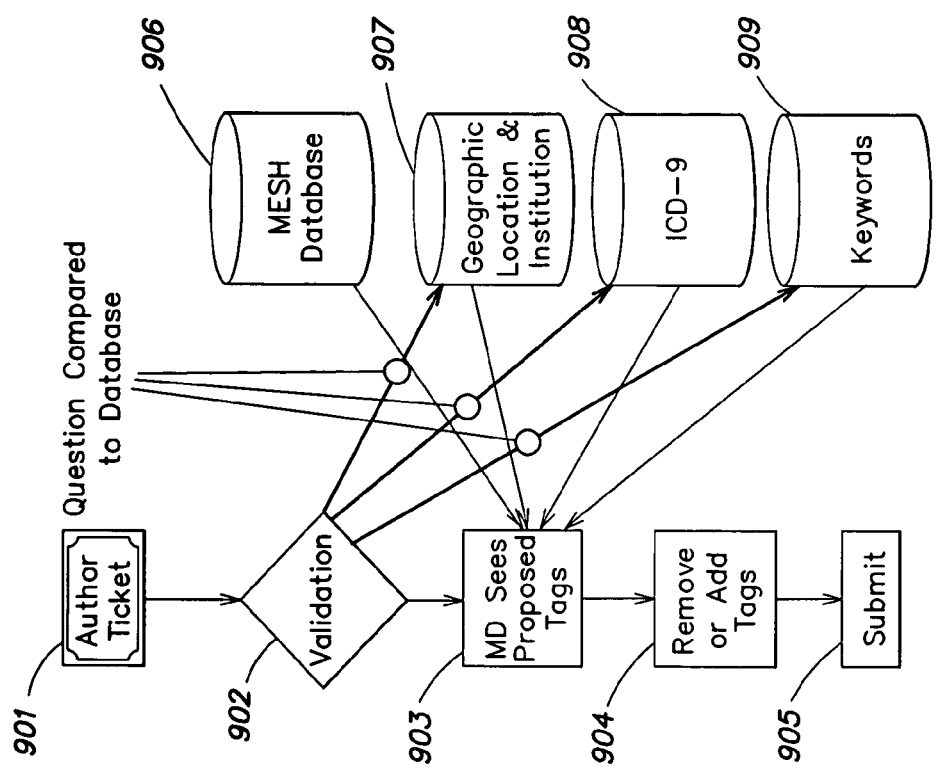
FIG. 9A is a block diagram showing an example creation of a ticket and tagging process according to one embodiment of the present invention.

FIG. 9A is a block diagram showing an example creation of a ticket creation and tagging process according to one embodiment of the present invention. At block 901, a user (e.g., a physician or other person that has an observation or prediction) authors a ticket (e.g., on a client system 807A-807D of FIG. 8) for submission to the ecosystem (e.g., in the form of a distributed computer system 800). At block 902, the ticket is validated where it can be verified that the ticket is an original concept, is not similar to other tickets, etc. Further, the ticket may be analyzed in order to provide one or more classifications (e.g., tags) for the observations that may be associated with the ticket. Such tag information may be used to determine an initial value of the ticket, based on the related subject matter (e.g., an event related to a pacemaker vs. a general health event).

In one embodiment, tags may initially be provided by the author of the ticket. Further, in another example system, the system may generate and/or suggest other tags that could be associated with the ticket. Such tags may be generated, for example, based on associations (or groups) of related tags defined for similar tickets. Such tickets may include, for example, tickets having similar tags and which feedback for such tickets has been provided. Tags may also be suggested based on comparison with industry databases, similar keywords, synonym databases, or any other source of tag information.

In one example, the question or observation posed by the ticket may be compared to one or more databases (e.g., a keyword database 909 having keywords of other ticket entries) to determine whether the ticket is an original ticket, and to create tags for the ticket. Further, the ecosystem may have the ability to access other common databases such as, for example, disease and injury databases associated with the International Statistical Classification of Diseases and Related Health Problems (commonly known by the abbreviation ICD) (e.g., ICD-9 database 908), MEDLINE database (e.g., MeSH database 906), geographic and institution databases (block 907) or any other type of database resource to determine if the observation is original and/or determine the classification(s) of the ticket. Such classifications may occur automatically, or may be posed to the author of the ticket as suggested classifications.

Once validated, the physician or other user may be presented a list of tags to which the ticket may be associated (block 903). The physician may then review the tags and add to them or modify the tags, as appropriate (block 904). Once the ticket is complete, the physician or other user submits the ticket to the ecosystem at block 905.

FIG. 9B is a block diagram showing example database elements according to one embodiment of the present invention that may be used in a ticket access and triggering process. For example, a user may search for and/or set triggers for particular tickets based on their tag information. For instance, a tagged ticket 911 in database 916 may be located in a user interface (e.g., a browser program interface) by entering in one or more tags (or classifications). For instance, tags may be located based on defined classifications in the database (e.g., medical terms in a MeSH database 912, keywords 914 in a keyword database 909, etc.). Further, the ticket may be searched according to other information, such as, for example, a location of or distance to the originator of the ticket (e.g., by accessing a geography database 913), a particular vote pattern of the originating user 915 or any other type of information relating to the ticket and/or its user. In this way, users can both classify tickets and locate tickets of interest once submitted.

Figure 10:
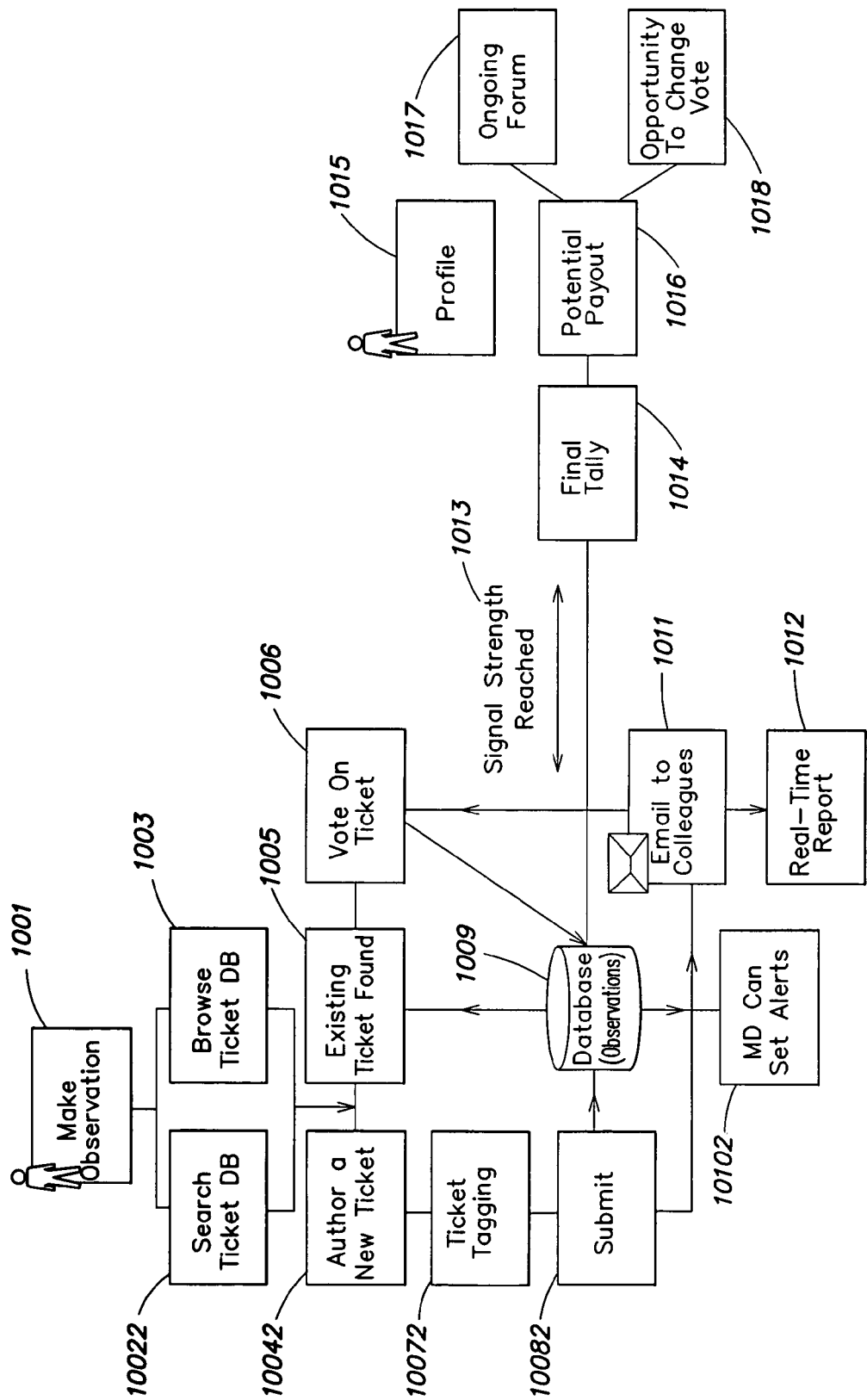
FIG. 10 is a flow chart showing an overall logic flow of ticket creation and lifetime in an online system according to one embodiment of the present invention.

FIG. 10 is a flow chart showing an overall logic flow of ticket creation and lifetime in an online system according to one embodiment of the present invention. As discussed above, a user may make an observation and possibly submit the observation to an online ecosystem in the form of a ticket, or corroborate or refute a similar observation associated with an existing ticket. At block 1001, the user makes an observation. As discussed above, the user may search an online ticket database (block 1002) to determine whether a similar ticket exists, or may browse the ticket database (block 1003) by viewing, for example, a list of recent tickets authored in a ticket database, highest ranked tickets, or other criteria or listing. In one embodiment, a user may locate tickets based on classification information associated with a ticket. Such classification information may be in the form of one or more tags created by the ticket creator, the ecosystem, or other entity.

At block 1004, the user may author a new ticket if the observation is original, or may alternatively find (block 1005) and vote on (block 1006) an existing ticket. According to one aspect of the present invention, as discussed above, tickets created in the ecosystem may have tags or other classification information associated with the ticket (block 1007) so that the ticket may be located easily by users, the ecosystem, or other entity. According to one embodiment, tickets that are validated and classified may then be submitted to the ecosystem (block 1008) where they can be viewed and voted on by users. Also as discussed, the observations may be stored in the form of a ticket in a database (block 1009).

Users may set alerts or triggers (block 1010) that, when activated, notify the other user that a ticket having particular criteria has been submitted to the ecosystem. For instance, such triggers may be activated based on classification information (e.g., tag information) associated with a particular ticket. Also, once submitted, a ticket may be forwarded to colleagues (block 1011) or other types of users targeted by the ticket. Ticket status may also be viewed by the originator in real time, as votes are received along with any opinion data (block 1012).

Users continue to vote and submit opinions on the created ticket until a signal strength is reached (e.g., a consensus is formed and determined by the ecosystem) at block 1013. Determination of signal strength (or consensus) may be determined by any criteria, including, but not limited to determining a minimum number of votes received on a particular ticket, ratio of agreeing to disagreeing votes, or other criteria and/or combination thereof. At block 1014, a final tally of the votes is determined, after which is determined a potential payout at block 1016. At block 1015, the user's profile (an originator, a voter) may be updated to reflect the final status of the ticket, and any adjustment in the user's rank or other profile information (e.g., ability to predict outcomes).

After a closing of the vote, there may be continued activity relating the ticket including, but not limited to, a user being able to change their vote (block 1018), participation in an ongoing forum (block 1017), or other activity relating to the ticket.

Figure 11:
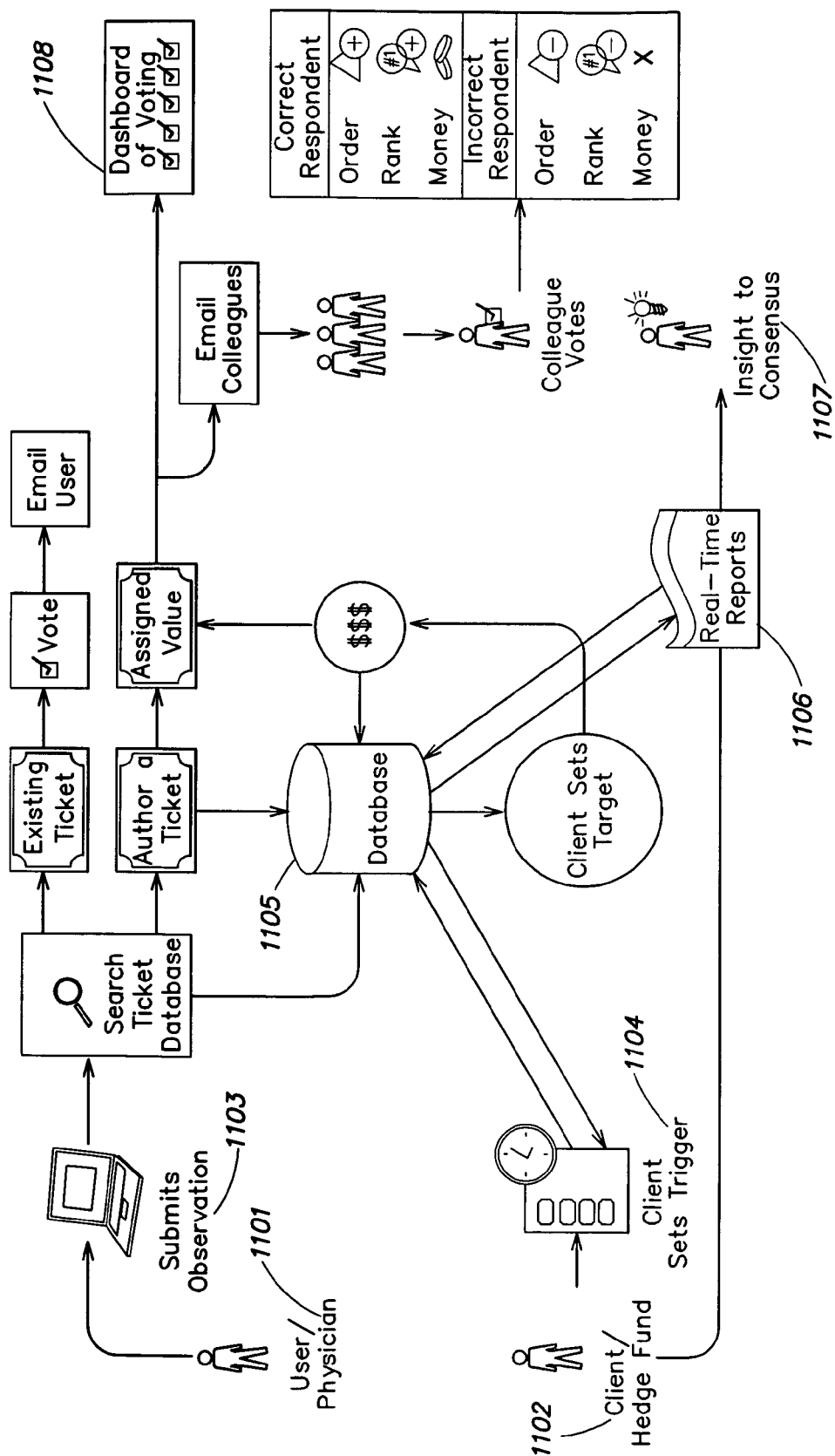
FIG. 11 is a flow chart showing a thematic logic flow of ticket creation and lifetime in an application to the healthcare industry according to one embodiment of the present invention.

FIG. 11 is a flow chart showing a thematic logic flow of ticket creation and lifetime in an application to the healthcare industry according to one embodiment of the present invention. As discussed above, a user/physician 1101 may make an observation 1103 that may relate to one or more triggers set by a client 1102. The user may either author an original ticket or vote on an existing ticket as discussed above.

In one example, client 1102 may be an investor that would like to observe a particular company and/or its products. To this end, the client 1102 sets a trigger 1104 that is stored in a database 1105 of the ecosystem. If the user/physician makes an observation that activates the trigger, client 1102 is notified. Similarly, client 1102 may make his/her own observation and propose the same to the ecosystem for action by one or more users.

In any case, both the client 1102 and user/physician 1101 may view a status of the ticket. In one example, the user/physician may be presented a "dashboard" view 1108 of the tickets created by the particular user, and their statuses. Client 1102 may be presented real-time reports 1106 relating to the tickets owned by the client (e.g., through bidding or sponsorship) and may therefore view any insights related to consensus 1107.

Figure 12:
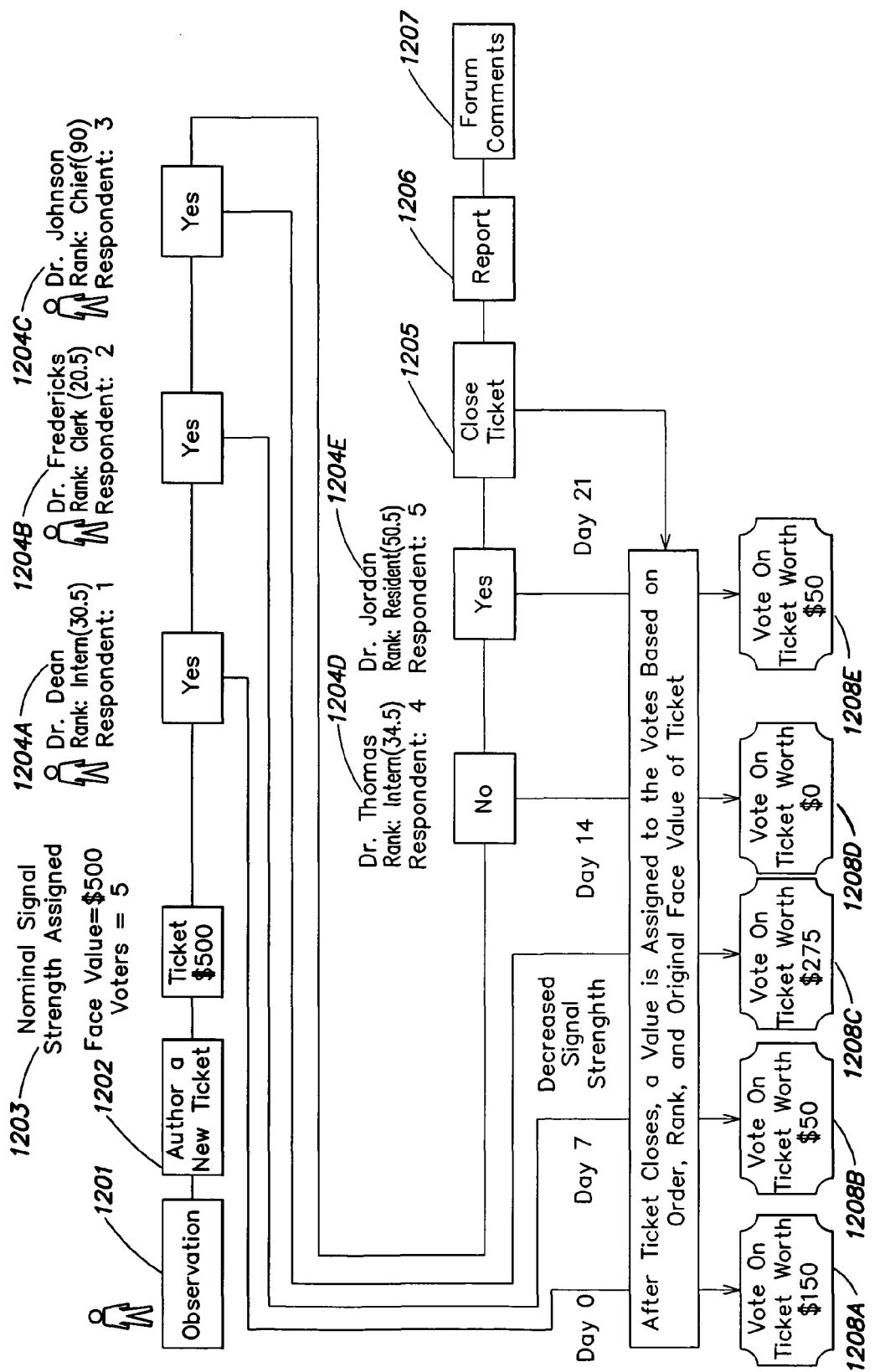
FIG. 12 is a flow chart showing another example logic flow of ticket creation and lifetime according to one embodiment of the present invention.

FIG. 12 is a flow chart showing another example logic flow of ticket creation and lifetime according to one embodiment of the present invention. At block 1201, a user has an observation and authors a new ticket at bock 1202. At block 1203, a nominal signal strength of five (5) is assigned to the ticket, in that it will take five votes until signal strength is reached. Other methods for determining signal strength may be used, and using the number of received votes in one of many possible methods. The ticket may also be assigned an initial value of $500, although this value may be any value related to the worth of the observation.

At block 1204A, a first user (Dr. Dean, an intern (physician in-training) having a rank value of 30.5) submits a first vote on the ticket. Further users may submit votes on the ticket at blocks 1204B-1204E until the ticket closes at block 1205. Such votes may also have a corresponding vote value at blocks 1208A-1208E, respectively. Notably, although the first user that votes has a lower rank (30.5) than a later user (50.5), the value of the first user's vote (1208A) is valued higher than the vote of the fifth user (1208E), as earlier votes are valued more highly than later votes on the same ticket. Also, it is noted that votes by users having a higher rank will be valued more highly (e.g., a vote by Dr. Johnson (1208C) than the first voter Dr. Dean (1208A), due to the different rankings of the users. Also, voters that incorrectly vote (Dr. Thomas at block 1204D) will yield a value of $0 for their vote (e.g., 1208D).

At block 1206, a report is generated after ticket closing, summarizing the result of the voting process. Such a report may be made available to the user that originated the ticket and a client that subscribes to the ticket. After the voting concludes, and the ticket closes, one or more actions may occur, such as conducting a forum to receive additional comments (block 1207), allowing users to change their votes, etc.

Figure 13A:
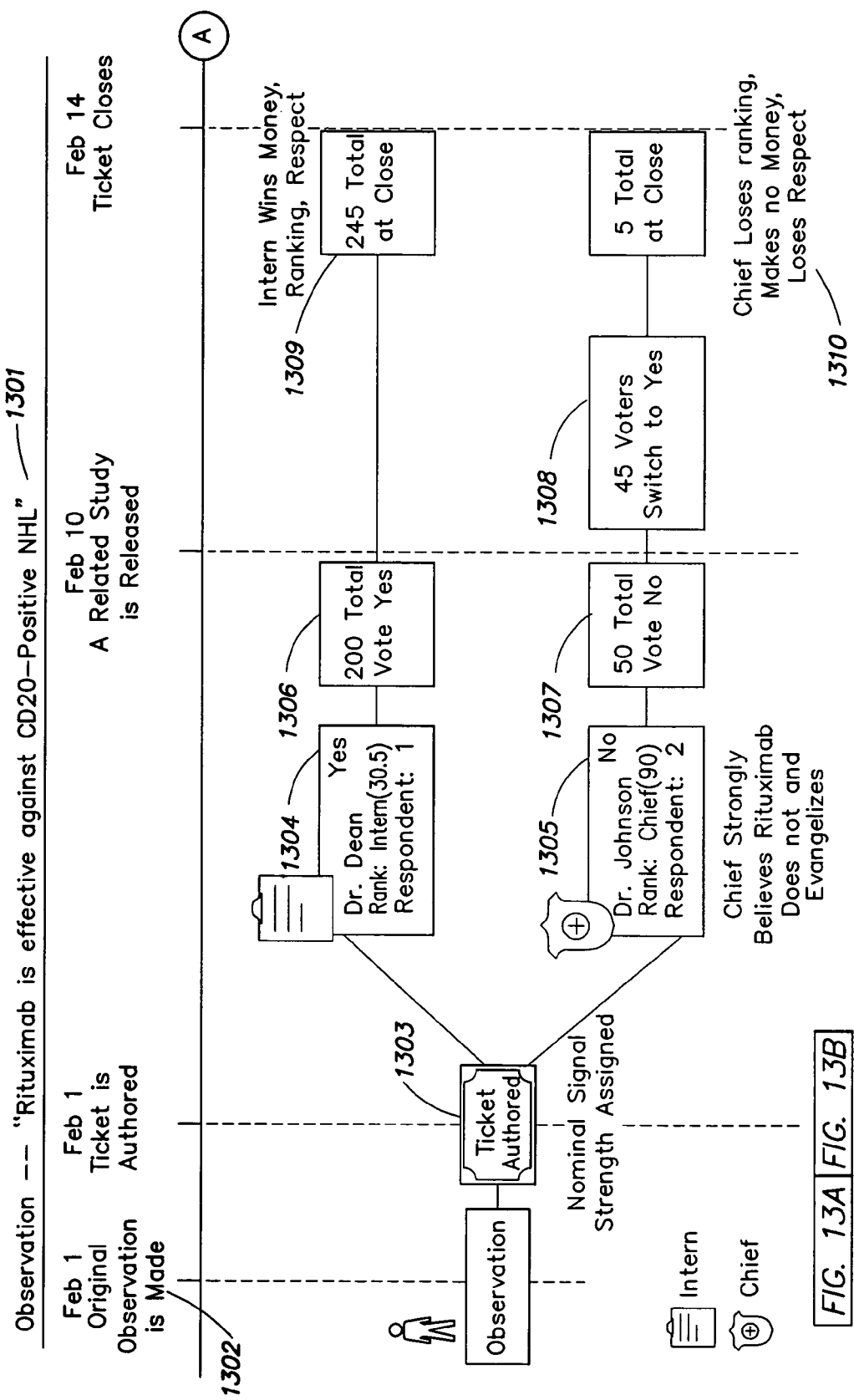
FIGS. 13A and 13B (collectively, FIG. 13) include a flow chart showing another example logic flow of ticket creation and lifetime according to another embodiment of the present invention.
Figure 13B:
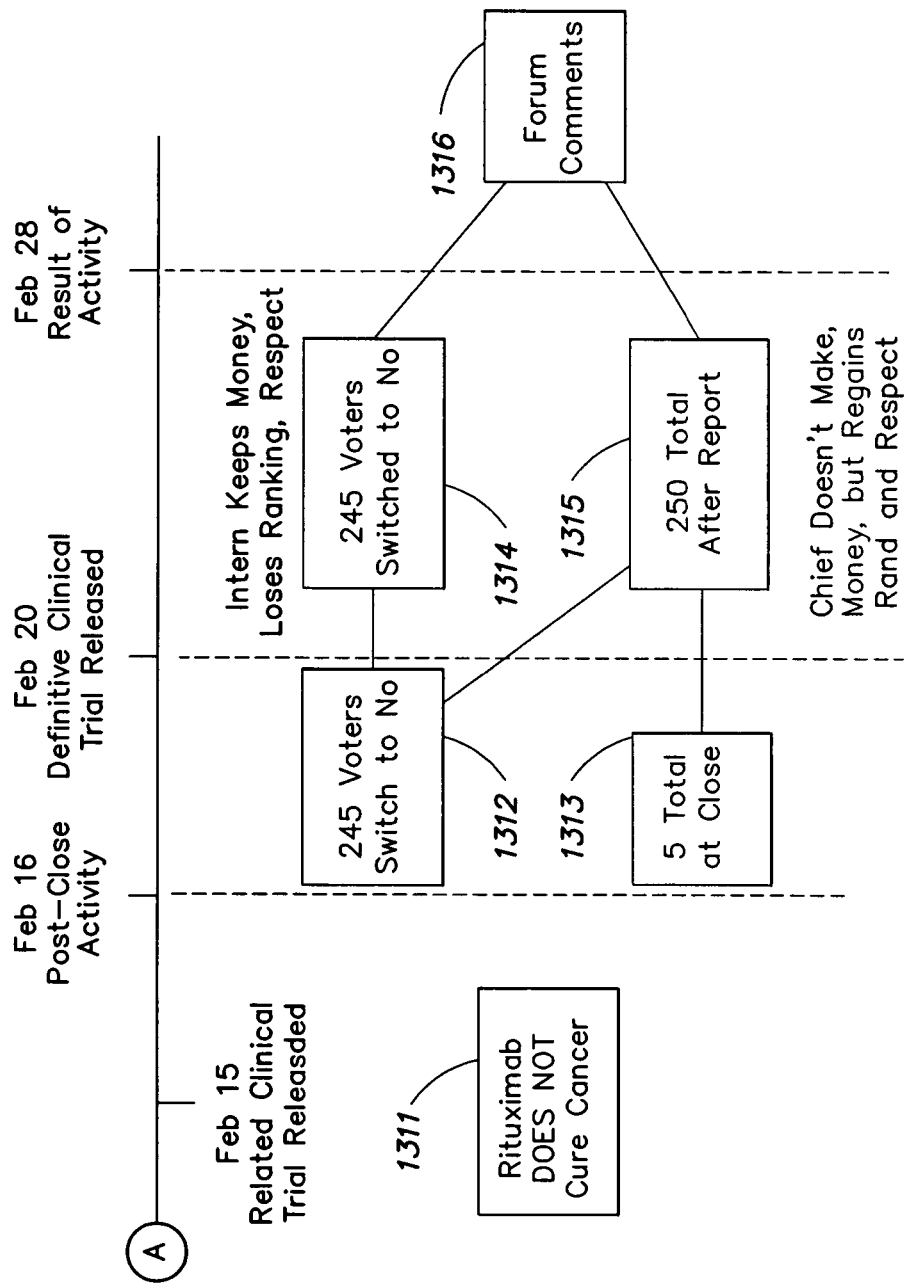

FIG. 13 is a flow chart showing another example logic flow of ticket creation and lifetime according to another embodiment of the present invention which illustrates activity after the close of voting. For example, an observation "Rituximab is effective against CD20-positive NHL." is made (block 1302) by a physician. A ticket is authored by the physician/user (block 1303) and is submitted to the ecosystem. A first vote is received (block 1304) by an intern who votes "yes" to the observation, after which a vote of "no" is received (block 1305) from a more experienced physician user. Afterwards, 200 users vote "yes" (block 1306) and 50 users vote "no" (block 1307). During the voting process and prior to ticket close, 45 of the users that voted "no" change their responses to "yes" (block 1308), and at ticket close, there are 245 votes in favor of the observation (block 1309) and 5 votes against the observation (block 1310). Notably, due to the consensus forming in favor of the observation, the ranking and payout of the intern who voted "yes" increases, while the payout and the ranking of more-highly ranked user decreases.

However, after ticket close, the result of a clinical trial is released to the public wherein it is shown that the observation is false (e.g., Rituximab does not cure cancer). In response, 245 of the users who voted "yes" to ticket switch their answers to "no" (block 1312) while 5 users maintain their answers as "yes" (block 1313) until they change their votes to "no" after receiving the report (block 1315). Notably, in this example, the intern keeps the money earned through the voting process prior to ticket closing, however, his ranking an respect is lost due to activity after ticket closing. Also, the higher-ranked user does not make any money due to the change in voting after ticket closing, but gains a higher ranking and respect. Additional forum comments may be received at block 1316.

User Interfaces

Figure 14:
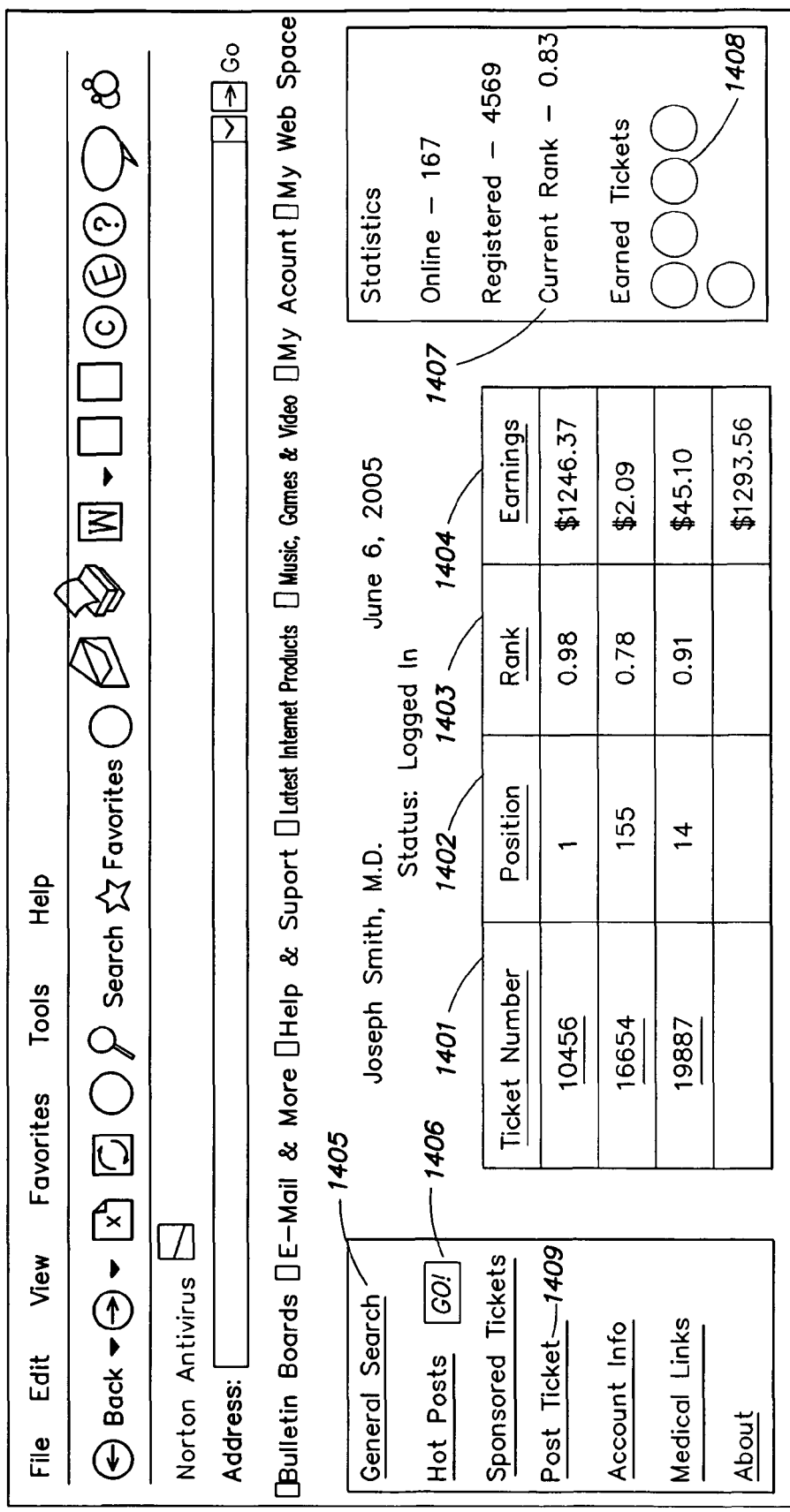
FIG. 14 is a diagram showing an example interface of an online system according to one embodiment of the present invention.

The ecosystem and its associated computer system(s) may present various user interfaces for submitting, organizing, and reporting various information related to the ecosystem. FIG. 14 is a diagram showing an example interface 1400 of an online system according to one embodiment of the present invention. The diagram shows a user screen that may be displayed, for example, in an interface of a browser program executing on a general purpose computer system as discussed above with reference to FIGS. 7-8.

In one embodiment, interface 1400 may be personalized for a user that logs into the ecosystem. In one embodiment of the present invention, the user logs into the system and may be permitted to view his/her name, title, date, time, and status. In addition, the user may be permitted to view all the tickets 1401 he/she has authored and voted on, along with his/her rank 1403, position 1402 and earnings 1404 generated through use of the system. The user can also view various statistics, such as the number of users that are in online in real-time, the number of users that are registered with the ecosystem, current ranking 1407 and the number of earned tickets 1408 for that particular user. The earning number of tickets may be, for example, determined based on the number of votes placed for other tickets existing in the system.

Also, there may be one or more controls (e.g., links, buttons, input fields, etc.) that permit a user to search and/or browse tickets in the database. For instance, a selection of control 1405 may cause an interface to be displayed that permits a user to locate tickets based on keyword, tag information, or other criteria. A control 1406 may, when selected by the user, display the most popular tickets in the system based on activity, value, and or any other parameter, either alone or in combination. A further control 1409 may be provide that, when activated, displays to the user an interface in which the user may author and submit a ticket to the ecosystem.

Interface 1400 may have one or more associated interfaces (not shown) in which a user (e.g., either an information provider or an information consumer) may perform functions relating to the ecosystem. For instance, an information provider may search and submit tickets, create descriptions of observations, set triggers, receive updates, forward tickets to user groups, colleagues, etc. Similarly, information consumers may be presented one or more additional interfaces that permit the information consumer to submit tickets for action by users, bid on outcomes of existing tickets, view reports and opinion results, etc.

For example, after a user votes on a ticket, the user may be informed where they are in the voting order (first, second, third, etc.). However, the user may, according to one embodiment, may not be given any information on the current "state" of the votes. In another embodiment, only the user originating the ticket may be permitted to view voting status. In parallel, the client that has successfully won the bid for that ticket may be permitted to see votes materializing in real-time. According to one embodiment, results of the ticket may be kept hidden from ecosystem users until the ticket closes. According to one embodiment, it is appreciated that actual results should be hidden from ecosystem users, otherwise the results of the votes of the users will influence how subsequent users vote. This is a critical flaw in conventional "market style" systems, where the issue's value (e.g., current market value) transmits information to the voter. When the ticket reaches signal strength (either an absolute number of votes and/or a clear consensus), the "absolute results" of the ticket may be "published" (e.g., by displaying and/or sending the results to affected users) and users are paid out.

Figure 15:
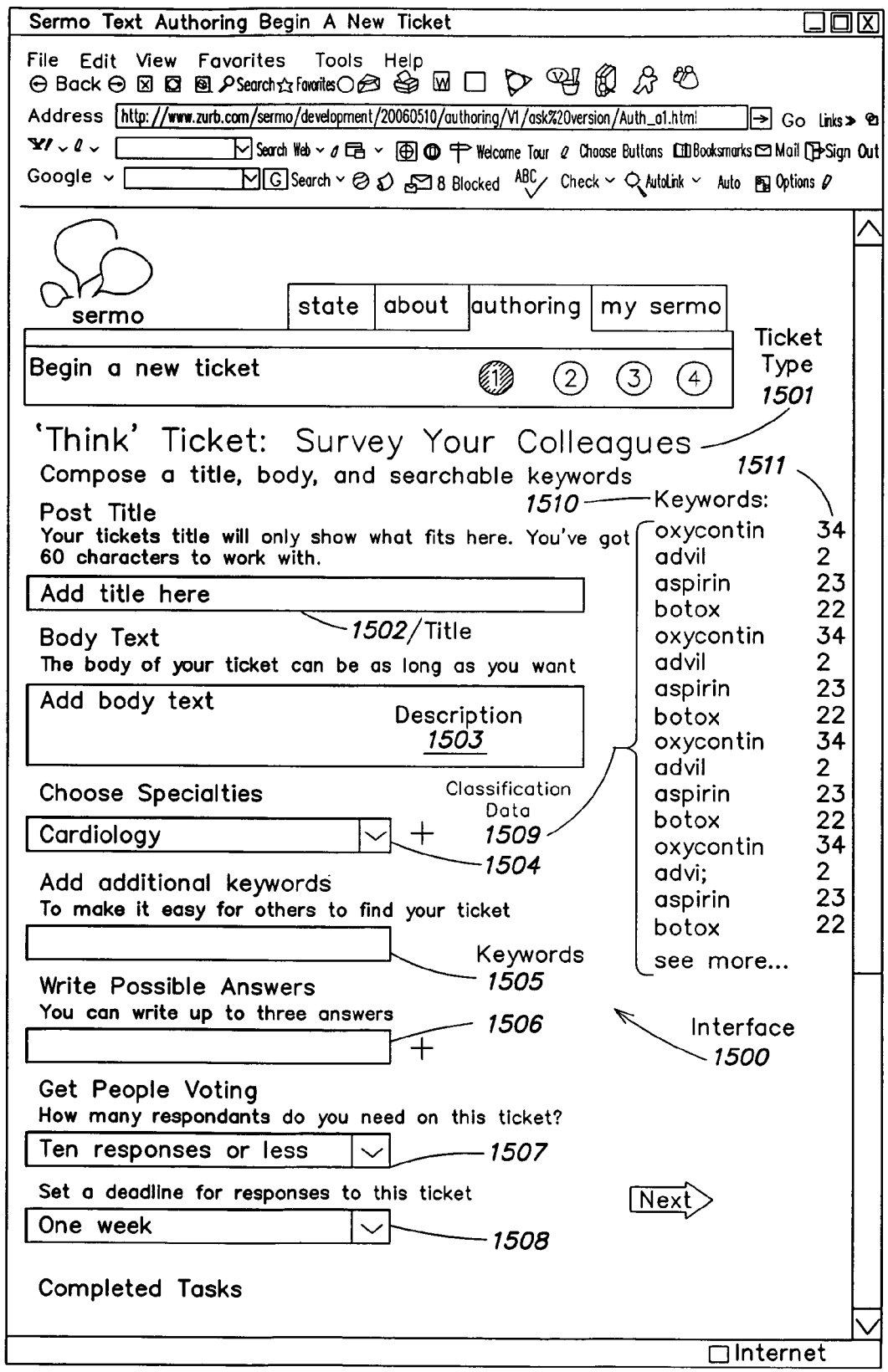
FIG. 15 is a diagram showing an example interface of an online system according to one embodiment of the present invention.

FIG. 15 shows another example interface 1500 according to one embodiment of the present invention. For example, an online ecosystem may support the creation of various types of tickets. For instance, one type of ticket may relate to an observation of a user (e.g., a "Case" ticket type, not shown), the user having a first-hand observation of an event. Other tickets may relate to an interpretation of observations (e.g., a "Consult" ticket type) upon which a survey of colleagues is desired. Tickets may have more that one type of classification, depending on the observation.

A ticket may have one or more ticket types (e.g., ticket type 1501) with which a ticket may be classified. One or more actions may be performed by the system in relation to the particular ticket type. For instance, users may be compensated differently based on a particular ticket type (e.g., a user authoring a "Case" ticket may be compensated independent of rank of the user as being the first to observe a particular event).

Interface 1500 may include other information associated with the ticket, such as a title 1502 and a description 1503 of the ticket. Such information may be used to form keywords, tags, or other classification information associated with the ticket, to locate similar tickets, and/or to send alerts to other users that a ticket has been created in a particular area or field. Interface 1500 may collect other information associated with a ticket, such as for example, specialty information 1504 and any other keywords 1505 that are associated with a ticket. Such information may also be used to locate tickets, trigger notifications to other users, or perform any other actions in the ecosystem.

A user may have an idea of possible responses that users may provide to the observation, and may propose such responses in area 1506 of interface 1500. In one embodiment, other users may select the predefined responses (e.g., in a multiple choice listing) or they may propose an alternative response. Such an alternative response may be presented to other users as an optional response.

Further, the author of the ticket may define the number of respondents needed (1507) on the ticket. The number of respondents may be used to determine when consensus is reached, or may be used to define a minimum level of response after which consensus can be determined. Further, the author may define a deadline (1508) for responding to the ticket. That is, the ticket may have some time priority to it, and if the deadline time is exceeded, the ticket may be automatically closed.

Also, as discussed above, classification data (e.g., classification data 1509) may be associated with a ticket in the form of one or more tags. Tags may, according to one embodiment, may take the form of keywords (1510) that are associated with tags created in the ecosystem. The user may be presented, in the interface of the system, a listing of the relevant tags associated with a ticket as it is being created. In a specific example, the presented list is changed dynamically in response to information being entered by the user in the ticket creation interface. For instance, as the user types in a description of the observation in the "Body Text" section, tags are automatically generated by the system in response to the entered information, and thus similar tickets may be located more easily, as tag information (and thus links to other similar tickets) is updated in real time. Interface 1500 may also use a quantity parameter (e.g., parameter 1511 indicating the quantity of tickets associated with a particular tag) or other relative parameter to indicate how frequently a tag is used or reference other tickets. A user may select the keyword or tag in the interface to locate other similar tickets, thus minimizing the number of similar tickets defined on such a system.

This invention is not limited in its application to the details of construction and the arrangement of components set forth in the previous description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and/or variations thereof in this document, is meant to encompass the items listed thereafter and equivalents thereof as well as additional items. Such terms are to be construed as open-ended, that is, to mean including but not limited to.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for conducting an online information service, the method comprising acts of:
   providing access for a plurality of registered users to an online information service hosted on a computer server, the plurality of registered users comprising at least information consumer users and information provider users;
   permitting, by the computer server, the information provider users and the information consumer users to create respective user defined events;
   permitting, by the computer server, the information provider users to submit opinions on user defined events;
   limiting, by the computer server, the information consumer users to creation of a respective user defined event and monitoring submitted opinions of the information provider users;
   providing a computer interface to at least one user of the plurality of registered users, wherein the computer interface is configured to accept information associated with a user defined event, wherein the information associated with the user defined event further comprises a possible outcome of a future event, and wherein the user interface is further configured to accept an observation associated with the possible outcome of the future event;
   accepting from the at least one user, over a communication network, information associated with the user defined event, including the possible outcome of the future event;
   collecting opinion information from a plurality of the registered information provider users, by the computer server, the opinion information relating to the user-defined event, wherein the opinion information collected from the plurality of information provider users includes at least a respective user's opinion on the possible outcome of the future event;

calculating, by a processor, a consensus for the collected opinion information, wherein the consensus includes a determination for the possible outcome of the future event;

compensating, by the computer server, the information provider users in response to submission of respective opinion information relating to the user defined event;

limiting, by the computer server, a length of time for receiving compensation for submission of the opinion information, wherein the act of limiting includes at least one of an act of varying the compensation provided based on a timing of the submission of opinion information, and limiting the length of time based on the calculation of consensus; and transmitting, over a communication network, at least one of the opinion information and the consensus to at least one information consumer.

2. The method according to claim 1, further comprising an act of permitting the at least one information consumer to define a trigger in a management component displayed in the computer interface, the trigger being activated by at least one parameter associated with the event defined by the at least one user.

3. The method according to claim 2, further comprising an act of activating the trigger upon the creation of an event including the at least one parameter.

4. The method according to claim 2, wherein the event relates to a product, and wherein the trigger, when activated, provides an indication to the at least one information consumer.

5. The method according to claim 3, further comprising:
providing an indication to the at least one information consumer that the trigger was activated in a user interface displayed on a respective host computer, wherein the act of providing includes an act of transmitting, by the computer server, the indication over the communication network for display on the user interface on the respective host computer, and wherein the act of providing the indication occurs in response to the processor matching the user defined event to the at least one parameter.

6. The method according to claim 1, wherein the act of varying the compensation provided based on a timing of the submission of opinion information, includes at least one of:
providing greater compensation for earlier submission of opinion information, and
compensating all submissions prior to a closing time associated with the user defined event and ending compensation after the closing time associated with the user defined event.

7. The method according to claim 6, further comprising an act of conducting a bid process to determine the at least one information consumer to which the opinion information is sold, wherein the act of conducting the bid process includes acts of:
classifying, the user defined event including the observation defining the possible outcome of the future event;
displaying the classification of the user defined event entered by the at least one user defining the possible outcome of the future event in a respective user interface to the at least one information consumer accessed over the communication network;
accepting, in the respective user interface at least one bid submitted by the at least one information consumer for access to at least one of the opinion information and the consensus for the collected opinion information.

8. The method according to claim 1, wherein the act of providing the opinion information to at least one information consumer is responsive to the act of determining a consensus of the collected opinion information.

9. The method according to claim 1, wherein the plurality of users include information providers that are identified experts in a subject field to which the opinion information relates and the method further comprises acts of:
classifying, by the computer server, the user defined event including the observation defining the possible outcome of the future event;
maintaining a profile of at least one of the plurality of users including the information providers, wherein the profile of the at least one of the plurality of users includes an identification of expertise in a subject field;
identifying, by the computer server, at least one of the plurality of users including the information providers based on a match in the classification of the user defined event and the profile of the at least one of the plurality of users; and
notifying, by the computer server, the at least one user of the plurality of users including the information providers that the user defined event including the observation defining the possible outcome of the future event has been created.

10. The method according to claim 1, further comprising an act of maintaining a profile of at least one of the plurality of users.

11. The method according to claim 10, further comprising an act of sending the event defined by at least one user to at least one user based on the maintained profile.

12. The method according to claim 11, further comprising an act of targeting the at least one user to receive the event, wherein the act of targeting is performed responsive to a parameter associated with the maintained profile.

13. The method according to claim 12, wherein the parameter measures an ability of the at least one user to predict event outcomes and the method further comprises an act of updating the maintained profile, by the computer server, in response to an act of determining, by the computer server that a submission of opinion information relating to an future event matched an actual outcome of the future event.

14. The method according to claim 12, wherein the parameter measures an ability of the at least one user to recognize trends in opinions and the method further comprises an act of updating the maintained profile, by the computer server, to reflect the timing of the at least one user's submission of opinion information, in response to an act of determining, by the computer server that a submission of opinion information relating to an event matched an actual outcome of the future event.

15. The method according to claim 12, wherein the parameter measures an ability of the at least one user to influence opinions of other users and the method further comprises an act of updating the maintained profile, by the computer server, in response to an act of determining, by the computer server that a submission of opinion information relating to an event matched an actual outcome of the future event.

16. The method according to claim 1, further comprising an act of permitting at least one of the plurality of users to change their opinion on the possible outcome of the future event, wherein the act of permitting the at least one of the plurality of users to change their opinion, includes permitting the at least one user to select a respective submitted opinion on the possible outcome of the future event, and permitting the at least one user to change the submitted respective opinion within the user interface.

17. A system, including at least one processor for executing instructions operatively connected to a memory, configured to conduct an online information service, the system comprising:
- an access component configured to provide access to an online information service, wherein the online information service includes a plurality of registered users, wherein the plurality of registered users comprise at least information consumer users and information provider users;
- a display component configured to display to the at least one user of the plurality of registered users an interface for entering information associated with a user defined event, wherein the interface is further configured to:
  - permit the at least one user to establish an observation defining a possible outcome of a future event;
  - permit the information provider users to submit opinions on the user defined events;
- wherein the access component is further configured to limit the information consumer users to creation of a respective user defined event and monitoring submitted opinions of the information provider users;
- a communication component configured to accept the information associated with the user defined event, wherein the information associated with the user defined event includes the observation defining the possible outcome of the future event;
- a collection component configured to collect opinion information from a plurality of users, the opinion information relating to the event defined by at least one user, and wherein the opinion information includes at least a respective user's opinion on the possible outcome of the future event;
- a consensus component configured to calculate a consensus for the collected opinion information, wherein the calculation of the consensus includes a determination for the possible outcome of the future event;
- a compensation component configured to compensate information provider users in response to submission of respective opinion information relating to the user defined event, wherein the compensation component is further configured to
  - limit a length of time for receiving compensation, wherein limiting the length of time for receiving compensation includes at least one of varying the compensation provided based on a timing of the submission of opinion information and limiting the length of time based on the calculation of consensus; and
- wherein the communication component is configured to transmit over a network, at least one of the opinion information and the consensus to at least one information consumer.

18. The system according to claim 17, wherein the interface is further configured to:
- display a plurality of user defined events;
- permit selection of at least one of the plurality of user defined events;
- provide an indication of an incentive associated with the at least one of the plurality of user defined events, wherein the incentive is based at least in part on a user's profile.

19. The system according to claim 17, further comprising a management component displayed in the interface, the management component configured to permit at least one information consumer to define a trigger associated with the user defined event, wherein the trigger is configured to be activated by at least one parameter associated with the user defined event, in response to a determination that the requirements for the at least one parameter have been met.

20. The system according to claim 17, further comprising a user ranking component, wherein the user ranking component is configured to dynamically calculate a user rank.

21. The system according to claim 17, wherein the calculation of the consensus includes a determination that a consensus will not be reached.

22. The method according to claim 1, wherein the user defined event is submitted by an information consumer, and wherein the method further comprises an act of determining the length of time in response to criteria established by the information consumer for the calculation of consensus.

23. The method according to claim 22, wherein the method further comprises an act of funding the compensation, at least in part, by requiring at least one information consumer to submit payment in order to access at least one of the user defined event and the opinion information relating to the user defined event.

24. The method according to claim 1, wherein the method further comprises:
- permitting access by at least one information consumer user to at least one of the user defined event and the opinion information responsive to receiving payment from the at least one information consumer user.

25. The method according to claim 1, wherein permitting the information providers to create respective user defined events and submit opinions on user defined events includes permitting free access to the user defined event and the opinions on the user defined events.

26. The method according to claim 1, wherein monitoring submitted opinions includes at least one of accessing the submitted opinions, accessing at least a portion of the submitted opinions, accessing aggregate statistics from submitted opinions, accessing analysis of the submitted opinions by the computer system, and accessing patterns generated by the computer system from the submitted opinions.

27. The system according to claim 17, wherein monitoring submitted opinions includes at least one of accessing the submitted opinions, accessing at least a portion of the submitted opinions, accessing aggregate statistics from submitted opinions, accessing analysis of the submitted opinions by the computer system, and accessing patterns generated by the computer system from the submitted opinions.

28. The system according to claim 17, wherein varying the compensating provided based on a timing of the submission of opinion information, includes at least one of:
- providing greater compensation for earlier submission of opinion information; and
- compensating all submissions prior to a closing time associated with the user defined event and ending compensation after the closing time associated with the user defined event.

* * * * *